United States Patent
Moravek et al.

(10) Patent No.: US 10,987,697 B2
(45) Date of Patent: Apr. 27, 2021

(54) MULTI-LAYER CURABLE COMPOSITIONS CONTAINING 1,1-DI-ACTIVATED VINYL COMPOUND PRODUCTS AND RELATED PROCESSES

(71) Applicant: PPG Industries Ohio, Inc., Cleveland, OH (US)

(72) Inventors: Scott J. Moravek, Mars, PA (US); Daniel Connor, Evans City, PA (US); Adam B. Powell, Wexford, PA (US); Kurt G. Olson, Gibsonia, PA (US); Shanti Swarup, Allison Park, PA (US); Caroline S. Harris, Pittsburgh, PA (US); Davina J. Schwartzmiller, Rural Valley, PA (US); Aditya Gottumukkala, Monroeville, PA (US); John M. Furar, Pittsburgh, PA (US); William E. Eibon, Elyria, OH (US); Allison G. Condie, Valencia, PA (US); Richard J. Sadvary, Tarentum, PA (US); Scott W. Sisco, Glenshaw, PA (US); Shiryn Tyebjee, Tarentum, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 179 days.

(21) Appl. No.: 16/320,534

(22) PCT Filed: Jul. 26, 2017

(86) PCT No.: PCT/US2017/044032
§ 371 (c)(1),
(2) Date: Jan. 25, 2019

(87) PCT Pub. No.: WO2018/022804
PCT Pub. Date: Feb. 1, 2018

(65) Prior Publication Data
US 2019/0270117 A1 Sep. 5, 2019

Related U.S. Application Data

(60) Provisional application No. 62/366,781, filed on Jul. 26, 2016, provisional application No. 62/372,365, filed on Aug. 9, 2016, provisional application No. 62/454,965, filed on Feb. 6, 2017.

(51) Int. Cl.
| | | |
|---|---|---|
| B05D 7/00 | (2006.01) | |
| C09D 4/00 | (2006.01) | |
| B05D 3/02 | (2006.01) | |
| C08K 5/17 | (2006.01) | |
| C08L 35/02 | (2006.01) | |

(52) U.S. Cl.
CPC ............ B05D 7/572 (2013.01); B05D 7/574 (2013.01); C09D 4/00 (2013.01); *B05D 3/0254* (2013.01); *B05D 7/534* (2013.01); *B05D 7/542* (2013.01); *B05D 2202/10* (2013.01); *B05D 2401/20* (2013.01); *B05D 2508/00* (2013.01); *B05D 2518/00* (2013.01); *C08K 5/17* (2013.01); *C08L 35/02* (2013.01)

(58) Field of Classification Search
None
See application file for complete search history.

(56) References Cited

U.S. PATENT DOCUMENTS

| | | | |
|---|---|---|---|
| 3,197,318 | A | 7/1965 | Halpern et al. |
| 3,352,798 | A | 11/1967 | Breslow et al. |
| 3,660,263 | A | 5/1972 | Auletta et al. |
| 4,382,109 | A | 5/1983 | Olson et al. |
| 4,452,861 | A | 6/1984 | Okamoto et al. |
| 4,740,534 | A | 4/1988 | Matsuda et al. |
| 4,885,191 | A | 12/1989 | Podszun et al. |
| 5,321,112 | A | 6/1994 | Olson |
| 5,639,828 | A | 6/1997 | Briggs et al. |
| 5,723,275 | A | 3/1998 | Wang et al. |
| 6,517,940 | B1 | 2/2003 | Millero et al. |
| 8,609,885 | B2 | 12/2013 | Malofsky et al. |
| 8,884,051 | B2 | 11/2014 | Malofsky et al. |
| 9,108,914 | B1 | 8/2015 | Malofsky et al. |
| 9,181,365 | B2 | 11/2015 | Malofsky et al. |
| 9,221,739 | B2 | 12/2015 | Malofsky et al. |
| 9,334,430 | B1 | 5/2016 | Stevenson et al. |
| 9,416,091 | B1 | 8/2016 | Sullivan et al. |

(Continued)

FOREIGN PATENT DOCUMENTS

| | | |
|---|---|---|
| CN | 101209446 A | 7/2008 |
| CN | 102796909 A | 11/2012 |

(Continued)

OTHER PUBLICATIONS

International Search Report and Written Opinion for International Patent Application No. PCT/EP2017/044010, dated Oct. 30, 2017.
International Search Report and Written Opinion for International Patent Application No. PCT/EP2017/043995, dated Jul. 11, 2017.
International Search Report and Written Opinion for International Patent Application No. PCT/EP2017/044041, dated Nov. 7, 2017.
International Search Report and Written Opinion for International Patent Application No. PCT/EP2017/044001, dated Oct. 30, 2017.

(Continued)

*Primary Examiner* — Shamim Ahmed
*Assistant Examiner* — Bradford M Gates
(74) *Attorney, Agent, or Firm* — K&L Gates LLP

(57) ABSTRACT

Multi-layer coatings comprising polymerization reaction products of 1,1-di-activated vinyl compounds are described. Also provided are processes for coating substrates with curable compositions comprising 1,1-di-activated vinyl compounds. Also provided are articles coated with this composition.

30 Claims, No Drawings

(56) References Cited

U.S. PATENT DOCUMENTS

| | | | |
|---|---|---|---|
| 9,567,475 B1 | 2/2017 | Palsule et al. | |
| 2003/0030170 A1 | 2/2003 | Abe et al. | |
| 2003/0042142 A1 | 3/2003 | Yamoto et al. | |
| 2005/0171273 A1 | 8/2005 | Ledwidge et al. | |
| 2012/0021228 A1* | 1/2012 | Kitagawa | B05D 7/572 |
| | | | 428/423.1 |
| 2013/0178551 A1* | 7/2013 | Tsai | C09D 7/65 |
| | | | 522/33 |
| 2014/0275419 A1 | 9/2014 | Ward et al. | |
| 2014/0288230 A1 | 9/2014 | Malofsky et al. | |
| 2014/0329980 A1 | 11/2014 | Malofsky et al. | |
| 2015/0056879 A1 | 2/2015 | Malofsky et al. | |
| 2015/0064476 A1* | 3/2015 | Kanda | C08G 18/423 |
| | | | 428/423.1 |
| 2015/0361283 A1 | 12/2015 | Malofsky et al. | |
| 2015/0368484 A1* | 12/2015 | Shishaku | C09D 7/43 |
| | | | 427/385.5 |
| 2016/0068618 A1 | 3/2016 | Sullivan et al. | |
| 2017/0260431 A1* | 9/2017 | Frahn | C09J 123/16 |
| 2018/0094115 A1 | 4/2018 | Martz et al. | |
| 2019/0153244 A1 | 5/2019 | Puodziukynaite et al. | |
| 2019/0160739 A1 | 5/2019 | Olson et al. | |
| 2019/0161620 A1 | 5/2019 | Zalich et al. | |
| 2019/0161637 A1 | 5/2019 | Olson et al. | |
| 2019/0161640 A1 | 5/2019 | Gottumukkala et al. | |

FOREIGN PATENT DOCUMENTS

| | | | | |
|---|---|---|---|---|
| CN | 103520771 A | 1/2014 | | |
| CN | 104312246 A | 1/2015 | | |
| CN | 105062164 A | 11/2015 | | |
| CN | 105536049 A | 5/2016 | | |
| CN | 105585879 | 5/2016 | | |
| EP | 0046088 A1 | 2/1982 | | |
| EP | 0327129 A1 | 8/1989 | | |
| EP | 0829756 A2 | 3/1998 | | |
| EP | 3042939 A1 | 7/2016 | | |
| JP | 2008019350 | 1/2008 | | |
| JP | 2013100599 | 5/2013 | | |
| JP | 2014077024 | 5/2014 | | |
| KR | 20140145084 A | 12/2014 | | |
| WO | 0032709 A1 | 6/2000 | | |
| WO | 2008086033 A1 | 7/2008 | | |
| WO | 2013036347 A1 | 3/2013 | | |
| WO | 2013149173 A1 | 3/2013 | | |
| WO | 2013059473 A2 | 4/2013 | | |
| WO | WO-2014119781 A1 * | 8/2014 | | C09D 133/06 |
| WO | 2015165808 A1 | 11/2015 | | |
| WO | WO-2016038089 A1 * | 3/2016 | | C09J 123/16 |
| WO | 2017210415 A1 | 12/2017 | | |
| WO | 2018022810 A1 | 2/2018 | | |

OTHER PUBLICATIONS

International Search Report and Written Opinion for International Patent Application No. PCT/EP2017/044032, dated Nov. 6, 2017.
International Search Report and Written Opinion for International Patent Application No. PCT/EP2017/044014, dated Oct. 27, 2017.
International Search Report and Written Opinion for International Patent Application No. PCT/EP2017/044005, dated Nov. 3, 2017.
Triallyl Isocyanurate TAIC Product Description, Mitsubishi International PolymerTrade Corporation, http://www.michem.com/triallyl_isocyanurate.html, 6 pages, Apr. 4, 2019.

* cited by examiner

MULTI-LAYER CURABLE COMPOSITIONS CONTAINING 1,1-DI-ACTIVATED VINYL COMPOUND PRODUCTS AND RELATED PROCESSES

BACKGROUND OF THE INVENTION

Curable compositions can be applied to a wide variety of substrates to provide color and/or other visual effects, corrosion resistance, adhesion, sealability, abrasion resistance, chemical resistance, and the like. For example, multi-layer coatings often include a basecoat layer that provides color and/or other visual effects and a topcoat layer, which sometimes comprises a clearcoat layer, and which provides an abrasion and scratch resistant layer. With respect to multi-layer coatings applied to metal substrates, such as automotive substrates, for example, a primer layer and/or a surface passivation layer may be applied to the bare metal substrate underneath overlying basecoats and topcoats. Generally, each layer of a multi-layer coating is separately dehydrated and/or cured under varying conditions, such as at different flashing and/or baking temperatures, for example, to form the final multi-layer coating.

SUMMARY OF THE INVENTION

A multi-layer coating comprises a first coating layer applied over at least a portion of a substrate, and a second coating layer applied over at least a portion of the first coating layer. The first coating layer and the second coating layer both independently comprise a polymeric resin. The first coating layer and/or the second coating layer, when cured, comprise a polymerization reaction product of a 1,1-di-activated vinyl compound, or a multifunctional form thereof, or a combination thereof.

A process for coating a substrate comprises applying a first coating layer over at least a portion of a substrate, applying a second coating layer over at least a portion of the first coating layer, and curing the first coating layer and/or the second coating layer. The first coating layer and the second coating layer both independently comprise a polymeric resin. The first coating layer and/or the second coating layer, when cured, comprise a polymerization reaction product of a 1,1-di-activated vinyl compound, or a multifunctional form thereof, or a combination thereof.

It is understood that the invention described in this specification is not necessarily limited to the examples summarized in this Summary.

DETAILED DESCRIPTION OF THE INVENTION

A "curable composition" as used in this specification refers to a composition that has one or more components that can participate in a curing transformation. The composition can undergo a change in its physical properties, over a period of time, as a result of chemical and/or physical processes. A curable composition may be curable at room temperature or a lower temperature, or may require exposure to elevated temperature such as a temperature above room temperature or other condition(s) to initiate and/or to accelerate the curing transformation. Once a curable composition is applied to a surface (and during application), the curing reaction can proceed to provide a cured composition. A cured composition develops a tack-free surface, cures, and then fully cures over a period of time. A composition is considered fully cured when the hardness no longer increases. Curable compositions provided by the present disclosure may be applied directly onto the surface of a substrate as a single layer (often referred to as monocoat) or a multi-layer and/or over an underlayer such as a primer by any suitable process.

The curable compositions provided by the present disclosure may be used, for example, in sealants, coatings, adhesives, encapsulants, and potting compositions. A sealant refers to a composition capable of producing a film that has the ability to resist operational conditions, such as moisture and temperature, and at least partially block the transmission of materials, such as water, fuel, and other liquids and gases. A sealant can be used to seal surfaces, smooth surfaces, fill gaps, seal joints, seal apertures, and other features. A coating refers to a curable composition that is deposited on an article that serves to protect the article and/or improve the appearance of the coated article. Examples include pigmented coatings that provide color to automobiles, airplanes, ships or free-standing structures such as metallic cans, buildings or bridges. An encapsulant refers to a curable composition that is applied on at least a portion of a material to increase durability and/or modulate the workable life of the material. Examples of encapsulants include films of polymeric ethylvinyl acetate used to cover parts of photovoltaic modules, to protect the modules from harsh environmental factors. A "putty" or "potting composition" refers to curable composition that is applied to a surface as a filler to smoothen surface irregularities and/or improve appearance. Examples of the application of putty include, but are not limited to, the repair of scratches, holes, deformities, and dents in automobile parts. Other examples of the application of putty include filling cracks in woodwork, securing glass and/or smoothening surfaces in buildings, particularly, walls and ceilings. Adhesives refer to curable compositions utilized to bond together two or more substrate materials. For example, structural adhesives may be used for binding together automotive or industrial components. As used in this disclosure the phrase "curable composition layer" is meant to include sealant, coating, adhesive, encapsulant, and potting composition layers that may be applied over a substrate or over other curable composition layers. For convenience and/or illustration purposes, this disclosure may refer to single or multiple "coating composition layers." However, the use of the phrase "coating composition layer" is used herein for illustrative purposes only, and should be understood to include the various other sealant, adhesive, encapsulant, and potting composition layers that are contemplated as possible alternatives. Accordingly, except as described in the present examples, the phrase "coating composition layer" can be used interchangeably to mean any other curable composition layer contemplated herein, such as a sealant, coating, adhesive, encapsulant, and potting composition layer, as determined by one of ordinary skill in the art.

As used in this specification, particularly in connection with coating layers or films, the terms "on," "onto," "over," and variants thereof (e.g., "applied over," "formed over," "deposited over," "provided over," "located over," and the like), mean applied, formed, deposited, provided, or otherwise located over a surface of a substrate, but not necessarily in contact with the surface of the substrate. For example, a coating layer "applied over" a substrate does not preclude the presence of one or more other coating layers of the same or different composition located between the applied coating layer and the substrate. Likewise, a second coating layer "applied over" a first coating layer does not preclude the presence of one or more other coating layers of the same or different composition located between the applied second coating layer and the applied first coating layer.

As used in this specification, the terms "polymer" and "polymeric" means prepolymers, oligomers, and both homopolymers and copolymers. As used in this specification, "prepolymer" means a polymer precursor capable of further reactions or polymerization by one or more reactive groups to form a higher molecular mass or crosslinked state.

In addition, when used in the specification, a "first coating layer" or "second coating layer" may include, separately, one or more coating applications to form either the first or second coating layer. Accordingly a "coating layer" as identified herein does not preclude the presence of one or more other coating applications of the same or different composition to form that layer. For example, where the first coating layer is a basecoat layer it is contemplated at one, two, or more basecoat applications may be used together to form the "first coating layer." Similarly, a clearcoat can be contemplated to have one, two or more clearcoat applications to form the "second coating layer".

As used in this specification, the prefix "poly" refers to two or more. For example, a "polyfunctional" molecule (whether a polymer, monomer, or other compound) comprises two or more reactive functional groups such as hydroxyl groups, amine groups, mercapto groups, carbamate groups, and the like. More specifically, "polyol" means a compound comprising two or more hydroxyl groups, "polyamine" means a compound comprising two or more amine groups, "polythiol" means a compound comprising two or more mercapto groups, and "polycarbamate" means a compound comprising two or more carbamate groups.

A polyfunctional compound such as a polyol, polyamine, polythiol, or polycarbamate may be a polymer, but does not have to be a polymer, and may comprise, for example, non-polymeric compounds. A polymeric polyol, polymeric polyamine, polymeric polythiol, or polymeric polycarbamate respectively comprises two or more pendant and/or terminal hydroxyl, amine, mercapto, or carbamate functional groups on the polymer molecules. A "pendant group" refers to a group that comprises an offshoot from the side of a polymer backbone and which does not comprise part of the polymer backbone, whereas "terminal group" refers to a group on an end of a polymer backbone and which comprises part of the polymer backbone.

Additionally, the terms polyol, polyamine, polythiol, and polycarbamate may encompass compounds comprising combinations of different types of functional groups. For example, a compound comprising two or more hydroxyl groups and two or more carbamate groups may be referred to as a polyol, a polycarbamate, or a polyol/polycarbamate. Furthermore, polyol, polyamine, polythiol, and polycarbamate compounds may comprise either or both the neutral functional groups (hydroxyl, amine, mercapto, or carbamate) and/or a salt of an ionized form of the functional group (e.g., alkoxide salts, ammonium salts, and the like).

As used in this specification, the term "1,1-di-activated vinyl compound" means a compound comprising a vinyl group having two electron withdrawing groups (EWG) covalently bonded to one of the t-bonded carbons and no substituents covalently bonded to the other t-bonded carbon (i.e., -EWG-C(=CH$_2$)-EWG—), wherein the electron withdrawing groups independently comprise halogen groups, haloalkyl groups, carbonyl-containing groups (e.g., esters, amides, aldehydes, ketones, acyl halides, carboxylic/carboxylate groups), cyano groups, sulfonate groups, ammonium groups, quaternary amine groups, or nitro groups. The term "multifunctional form" means a compound comprising two or more 1,1-di-activated vinyl groups covalently bonded in one molecule. For instance, a dialkyl methylene malonate is an example of a 1,1-di-activated vinyl compound, and a transesterification adduct of a dialkyl methylene malonate and a polyol is an example of a multifunctional form of a dialkyl methylene malonate.

The multi-layer coatings described in this specification contain at least two coating layers, both of which independently comprise a polymeric resin, and at least one of which comprises a polymerization reaction product of a 1,1-di-activated vinyl compound, or a multifunctional form thereof, or a combination thereof. The two coating layers can thus comprise the same polymeric resin or different polymeric resins, provided that at least one of the two coating layers comprises the polymerization reaction product. The polymerization reaction product can alone comprise the polymeric resin of the coating layer or layers containing the polymerization reaction product, or the coating layer or layers can further comprise one or more different, additional polymeric resins and/or other polyfunctional compounds.

The 1,1-di-activated vinyl compounds can comprise methylene dicarbonyl compounds, dihalo vinyl compounds, dihaloalkyl disubstituted vinyl compounds, or cyanoacrylate compounds, or multifunctional forms of any thereof, or combinations of any thereof. Examples of 1,1-di-activated vinyl compounds and multifunctional forms thereof that can be used to formulate curable compositions to form one or more coating layers in the multi-layer coatings are described in U.S. Pat. Nos. 8,609,885; 8,884,051; 9,108,914; 9,181,365; and 9,221,739, which are incorporated by reference into this specification. Additional examples of 1,1-di-activated vinyl compounds and multifunctional forms thereof that can be used to formulate curable compositions to form one or more coating layers in the multi-layer coatings are described in U.S. Publication Nos. 2014/0288230; 2014/0329980; and 2016/0068618, which are incorporated by reference into this specification.

The coating layers can comprise a polymerization reaction product of a 1,1-di-activated vinyl compound comprising a methylene malonate or a multifunctional form thereof, or a combination thereof. Methylene malonates are compounds having the general formula (I):

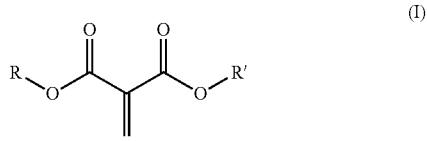

(I)

wherein R and R' may be the same or different and may represent nearly any substituent or side-chain, such as substituted or unsubstituted alkyl or aryl groups. For example, the coating layers can comprise a polymerization reaction product of a dialkyl methylene malonate, a diaryl methylene malonate, a multifunctional form of a dialkyl methylene malonate, or a multifunctional form of a diaryl methylene malonate, or a combination of any thereof.

A multifunctional form of a methylene malonate can comprise a transesterification adduct of the methylene malonate and a polyol. A multifunctional form of a methylene malonate can thus have the general formula (II):

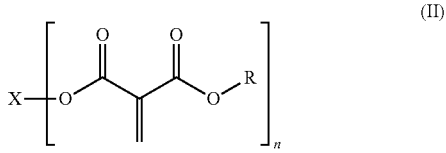

(II)

wherein n is greater than one, X is a polyol residue, and each R may be the same or different, as described above. As used herein the term "residue" refers to a group derived from the respective compound. For instance, in the above formula, X is an n-valent group derived from a polyol by a transesterification reaction involving methylene malonate and n hydroxyl groups of said polyol. Likewise, a polymer comprising residues of a certain compound is obtained from polymerizing said compound. In some examples, a multifunctional form of a methylene malonate can comprise a transesterification adduct of the methylene malonate and a diol, and thus have the general formula (III):

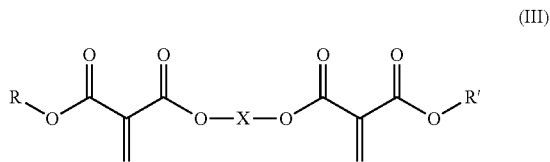

(III)

wherein X is a diol residue and R and R' may be the same or different, as described above.

Polyols that are suitable for the production of a transesterification adduct with a methylene malonate include, for example, polymeric polyols (such as polyether polyols, polyester polyols, acrylic polyols, and polycarbonate polyols) and monomeric polyols (such as alkane polyols, including alkane diols such as 1,5-pentanediol and 1,6-hexanediol). The transesterification adduct can be formed by the reaction of a methylene malonate and a polyol, in the presence of a catalyst, in a suitable reaction medium. Examples of transesterification adducts of methylene malonates and polyols that may be used in the curable compositions are described in U.S. Publication No. 2014/0329980 and U.S. Pat. No. 9,416,091, which are incorporated by reference herein. Further, the concentration of the transesterification adduct can be influenced by ratio of the reactants and/or distillation or evaporation of the reaction medium.

In some examples, the coating layers of the multi-layer coatings can comprise a polymerization reaction product of dimethyl methylene malonate (D3M), a multifunctional form of D3M, or both. In some examples, the coating layers of the multi-layer coatings can comprise a polymerization reaction product of diethyl methylene malonate (DEMM), a multifunctional form of DEMM, or both. The multifunctional forms of D3M or DEMM can comprise transesterification adducts of D3M or DEMM and a polyol, such as, for example, 1,5-pentanediol or 1,6-hexanediol.

In some examples, the coating layers of the multi-layer coatings can comprise a polymerization reaction product of a combination of a dialkyl methylene malonate and a multifunctional form of a dialkyl methylene malonate. The coating layers of the multi-layer coatings can comprise, for example, a polymerization reaction product of DEMM and a multifunctional form of DEMM comprising a transesterification adduct of DEMM and at least one polyol. The DEMM can be transesterified with a polyol comprising, for example, an alkane diol such as 1,5-pentanediol or 1,6-hexanediol.

In some examples, the curable compositions used to form the coating layers of the multi-layer coatings can comprise (in addition to the 1,1-di-activated vinyl compound, or a multifunctional form thereof, or a combination thereof) a polyol, a polyamine, a polythiol, or a polycarbamate, or a combination of any thereof. While not intending to be bound by any theory, it is believed that the vinyl group(s) in the 1,1-di-activated vinyl compounds and/or the multifunctional forms thereof can react via a Michael addition mechanism with the hydroxyl, amine, mercapto, and/or carbamate groups in polyol, polyamine, polythiol, and/or polycarbamate resins or other compounds (i.e., polyfunctional polymeric resins or polyfunctional monomeric compounds), and thereby form stable covalent linkages. Additionally, the 1,1-di-activated vinyl compounds and/or the multifunctional forms thereof can undergo self-polymerization reactions, thereby forming the polymerization reaction product, which may covalently bond to polyfunctional polymeric resins or polyfunctional monomeric compounds through the linkages formed by the Michael addition reactions with the hydroxyl, amine, mercapto, and/or carbamate groups. Therefore, the 1,1-di-activated vinyl compounds and/or the multifunctional forms thereof can function as crosslinking/curing agents for polyfunctional polymeric resins or polyfunctional monomeric compounds. In some example, the 1,1-di-activated vinyl compounds and/or the multifunctional forms thereof can provide a multiple-cure mechanism comprising both Michael addition reactions and polymerization reactions that crosslink and cure polyfunctional polymeric resins or polyfunctional monomeric compounds.

Polyfunctional polymeric resins that can be used to formulate curable compositions to form one or more coating layers in the multi-layer coatings, and which are crosslinked and cured with the 1,1-di-activated vinyl compounds and/or the multifunctional forms thereof, include polymeric resins comprising pendant and/or terminal hydroxyl, amine, mercapto, and/or carbamate groups, such as, for example, polyether polyols, polyester polyols, acrylic polyols, polycarbonate polyols, polyether polyamines, polyester polyamines, acrylic polyamines, polycarbonate polyamines, polyether polythiols, polyester polythiols, acrylic polythiols, polycarbonate polythiols, polyether polycarbamates, polyester polycarbamates, acrylic polycarbamates, polycarbonate polycarbamates, and combinations of any thereof. Additional polyfunctional polymeric resins that can be formulated in curable compositions and crosslinked and cured with 1,1-di-activated vinyl compounds and/or the multifunctional forms thereof include any polyfunctional polymeric resins that incorporate hydroxyl, amine, mercapto, or carbamate groups, or combinations of any thereof, including for example, polyester resins, polyurethane resins, polyurea resins, polyether resins, polythioether resins, polycarbonate resins, polycarbamate resins, epoxy resins, phenolic resins, and aminoplast resins (urea-formaldehyde and/or melamine-formaldehyde).

In addition to, or in lieu of, polyfunctional polymeric resins, polyfunctional monomeric compounds can be formulated in the curable compositions and crosslinked and cured with 1,1-di-activated vinyl compounds and/or the multifunctional forms thereof. If polyol compounds are used, they may be the same as or different from those used for forming the transesterification adducts described above. Examples of monomeric polyol compounds include, but are not necessarily limited to, glycols such as ethylene glycol, diethylene glycol, triethylene glycol, 1,2-propylene glycol, 1,3-butylene glycol, tetramethylene glycol, hexamethylene glycol, neopentyl glycol, pentaerythritol, and combinations of any thereof. Other suitable hydroxyl-containing polyfunctional monomeric compounds include, but are not limited to, 1,5-pentanediol, 1,6-hexanediol, cyclohexanedimethanol, 2-ethyl-1,6-hexanediol, 1,4-butanediol, 1,3-propanediol, trimethylol propane, 1,2,6-hexanetriol, glycerol, and combinations of any thereof. Additionally, monomeric amino alcohols that can be formulated in the curable compositions and crosslinked and cured with 1,1-di-activated vinyl compounds and/or the multifunctional forms thereof include, but are not limited to, ethanolamine, propanolamine, butanolamine, and combinations of any thereof.

Examples of monomeric polyamine compounds that can be formulated in curable compositions used to form one or more coating layers in the multi-layer coatings, and crosslinked and cured with 1,1-di-activated vinyl compounds and/or the multifunctional forms thereof, include, for example, diamines such as, for example, ethylenediamine, hexamethylenediamine, 1,2-propanediamine, 2-methyl-1,5-penta-methylenediamine, 2,2,4-trimethyl-1,6-hexanediamine, isophoronediamine, diaminocyclohexane, xylylenediamine, 1,12-diamino-4,9-dioxadodecane, and combinations of any thereof. Other suitable monomeric and polymeric polyamine compounds include polyetheramines such as the Jeffamine® products available from Huntsman Chemical Company.

Examples of monomeric and polymeric polythiol compounds that can be formulated in curable compositions used to form one or more coating layers in the multi-layer coatings, and crosslinked and cured with 1,1-di-activated vinyl compounds and/or the multifunctional forms thereof, include, for example, resins and compounds produced by the esterification of a polyol with a mercapto organic acid. Examples of suitable polyols include the polyols described above, and examples of suitable mercapto organic acids include thioglycolic acid and mercaptopropionic acid. Examples of monomeric polythiol compounds include, but are not limited to, glyceryl dithioglycolate, glyceryl trithioglycolate, glycol dimercaptoacetate, pentaerythritol tetramercaptoacetate, glycol di-(3-mercaptopropionate), pentaerythritol tetra(3-mercaptoproprionate), dipentaerythritol hexa(3-mercaptopropionate), trimethylolpropane tris-(thioglycolate), pentaerythritol tetrakis-(thioglycolate), ethyleneglycol dithioglycolate, trimethylolpropane tris-(βthiopropionate), pentaerythritol tetrakis-(β-thiopropionate), dipentaerythritol poly(β-thiopropionate), and combinations of any thereof. Other suitable monomeric and polymeric polythiol compounds include the Thiocure® products available from Bruno Bock Chemische Fabrik GmbH & Co. KG.

Examples of monomeric and polymeric polycarbamate compounds that can be formulated in curable compositions used to form one or more coating layers in the multi-layer coatings, and crosslinked and cured with 1,1-di-activated vinyl compounds and/or the multifunctional forms thereof, include, for example, resins and compounds produced by the transcarbamylation of a polyol with an alkyl carbamate (i.e., the transesterification of the alkyl carbamate with the polyol).

In addition to the 1,1-di-activated vinyl compound, or multifunctional form thereof, or combination thereof, the curable compositions used to form one or more coating layers in the multi-layer coatings can further comprise an activator. As used in this specification, the term "activator" means a compound or other agent capable of initiating and/or catalyzing (i) polymerization of 1,1-di-activated vinyl compounds or multifunctional forms thereof and/or (ii) addition reactions between 1,1-di-activated vinyl compounds or multifunctional forms thereof and polyfunctional components (e.g., polyol, polyamine, polythiol, and/or polycarbamate resins or compounds). The term "activator" includes (1) active forms of activator compounds and (2) latent precursor forms of activator compounds that are capable of conversion from the latent precursor form into the active form (e.g., by exposure to an effective amount of heat, electromagnetic radiation, pressure, or a chemical co-activator). Additionally, latent precursor forms of activator compounds that are capable of conversion into the active form include activators associated with a volatile or otherwise removable neutralizing agent or inhibitor compound that can evaporate or otherwise be removed from the curable composition when applied as a coating layer, thereby activating the activator.

The activator can comprise a base. As used in this specification, the term "base" means an electronegative compound or functional group capable of initiating the anionic polymerization of a 1,1-di-activated vinyl compound. Suitable activators include organic bases (e.g., amine-containing compounds and carboxylate salts), inorganic bases (e.g., hydroxide salts, carbonate salts, and metal oxides), organometallic compounds, and combinations of any thereof. Suitable activators also include polymers comprising pendant and/or terminal amine, carboxylate salt, or other base functionality capable of initiating the anionic polymerization of a 1,1-di-activated vinyl compound.

In some examples, the activator comprises a strong base (pH over 9, in water at 25° C.), a moderate base (pH from 8-9, in water at 25° C.), or a weak base (pH from over 7 to 8, in water at 25° C.), or a combination of any thereof. The activator may comprise, for example, sodium acetate; potassium acetate; acid salts of sodium, potassium, lithium, copper, or cobalt; tetrabutyl ammonium fluoride, chloride, or hydroxide; an amine, including primary, secondary, and tertiary amines; an amide; salts of polymer bound acids; benzoate salts; 2,4-pentanedionate salts; sorbate salts; propionate salts; secondary aliphatic amines; piperidine, piperazine, N-methylpiperazine, dibutylamine, morpholine, diethylamine, pyridine, triethylamine, tripropylamine, triethylenediamine, N,N-dimethylpiperazine, butylamine, pentylamine, hexylamine, heptylamine, nonylamine, decylamine; 1,4-diazabicyclo[2.2.2]octane (DABCO); 1,1'-iminobis-2-propanol (DIPA); 1,2-cyclohexaneamine; 1,3-cyclohexandimethanamine; 2-methylpentamethylenediamine; 3,3-iminodipropylamine; triacetone diamine (TAD); salts of amines with organic monocarboxylic acids; piperidine acetate; metal salt of a lower monocarboxylic acid; copper(II) acetate, cupric acetate monohydrate, potassium acetate, zinc acetate, zinc chloracetate, magnesium chloracetate, magnesium acetate; salts of acid containing polymers; salts of polyacrylic acid co-polymers; and combinations of any thereof.

In some examples, the curable compositions used to form one or more coating layers in the multi-layer coatings can comprise a tertiary amine activator such as, for example, DABCO; 2-(dimethylamino)ethanol (DMAE/DMEA); 2-piperazin-1-ylethylamine; N,N,N',N'-tetrakis(2-hydroxypropyl)ethylenediamine; 2-[2-(dimethylamino)ethoxy] ethanol; 1-[bis[3-(dimethylamino)propyl] amino]-2-propanol; N,N,N',N'',N''-pentamethyldiethylenetriamine; N,N,N',N'-tetraethyl-1,3-propanediamine; N,N,N',N'-tetramethyl-1,4-butanediamine; N,N,N',N'-tetramethyl-1,6-hexanediamine; 1,4,8,11-tetramethyl-1,4,8,11-tetraazacyclotetradecane; 1,3, 5-trimethylhexahydro-1,3,5-triazine; methyl dicocoamine; 1,8-diazabicycloundec-7-ene (DBU); 1,5 diazabicyclo-[4,3,0]-non-5-ene (DBN); 1,1,3,3-tetramethylguanidine; 1,5,7-Triazabicyclo[4.4.0]dec-5-ene; 7-Methyl-1,5,7-triazabicyclo[4.4.0]dec-5-ene; or combinations of any thereof. In some examples, a tertiary amine activator comprises a bicyclic guanidine compound or a substituted derivative thereof, such as, for example, 1,5,7-Triazabicyclo[4.4.0]dec-5-ene; or 7-Methyl-1,5,7-triazabicyclo[4.4.0]dec-5-ene, or a substituted derivative of either thereof, or a combination of any thereof.

The activator can comprise an ionic liquid. As used herein, the term "ionic liquid" means a salt having a melting point temperature of less than 100° C. at 1 atmosphere of pressure. Ionic liquids can be in a liquid state at room temperature (approximately 23° C.) and atmospheric pressure. Ionic liquids comprise a cation ionically associated with an anion. The cations can comprise, for example, heterocyclic nitrogen-containing organic cations such as imidazolium cations, pyrazolium cations, pyrrolidinium cations, pyridinium cations, pyrazinium cations, or pyrimidinium cations, including derivatives thereof; or other cations such as, for example, $C^1$–$C^{32}$ tetraalkylphosphonium cations, $C^1$–$C^{32}$ tetraalkylammonium cations, or $C^1$–$C^{32}$ trialkylsulfonium cations. The anions can comprise, for example, a halide ($F^-$, $Cl^-$, $Br^-$, $I^-$), formate, acetate, nitrate, phosphate, sulfonate, tetrafluoroborate, hexfluorophosphate, triflate (trifluoromethane sulfonate), bis(trifluoromethylsulfonyl)imide, tosylate, an alkyl sulfonate anion (e.g., methyl sulfonate), an alkylsulfate anion, a carboxylate anion, or a phthalate anion.

The ionic liquid activators used in the compositions, coatings, and processes described in this specification can comprise any combination of the above-described cations and anions that initiate and/or catalyze (i) polymerization of 1,1-di-activated vinyl compounds or multifunctional forms thereof and/or (ii) addition reactions between 1,1-di-activated vinyl compounds or multifunctional forms thereof and polyfunctional components (e.g., polyol, polyamine, polythiol, and/or polycarbamate resins or compounds).

The ionic liquid activator can comprise an imidazolium salt of the formula:

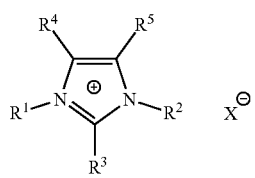

wherein $R^1$ and $R^2$ are each independently a $C_1$-$C_{12}$ alkyl group; $R^3$, $R^4$, and $R^5$ are each independently a hydrogen or a $C_1$-$C_{12}$ alkyl group, and X– is an anion. In some examples, $R^1$ and $R^2$ are each a $C_1$-$C_{12}$ alkyl group; and $R^3$, $R^4$, and $R^5$ are each a hydrogen atom. In some examples, $R^1$, $R^2$, and $R^3$ are each a $C_1$-$C_{12}$ alkyl group; and $R^4$ and $R^5$ are each a hydrogen atom.

The ionic liquid activator can comprise a pyrazolium salt of the formula:

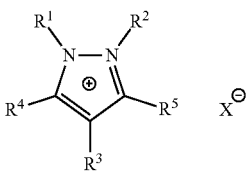

wherein $R^1$ and $R^2$ are each independently a $C_1$-$C_{12}$ alkyl group; $R^3$, $R^4$, and $R^5$ are each independently a hydrogen or a $C_1$-$C_{12}$ alkyl group, and X– is an anion. In some examples, $R^1$ and $R^2$ are each a $C_1$-$C_{12}$ alkyl group; and $R^3$, $R^4$, and $R^5$ are each a hydrogen atom. In some examples, $R^1$, $R^2$, and $R^3$ are each a $C_1$-$C_{12}$ alkyl group; and $R^4$ and $R^5$ are each a hydrogen atom.

The ionic liquid activator can comprise a pyridinium salt of the formula:

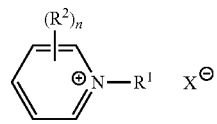

wherein $R^1$ is a $C_1$-$C_{12}$ alkyl group; $R^2$ are each independently a $C_1$-$C_{12}$ alkyl group, n is 0 to 5, and $X^-$ is an anion.

The ionic liquid activator can comprise a pyrimidinium salt and/or a pyrazinium salt of the formulas:

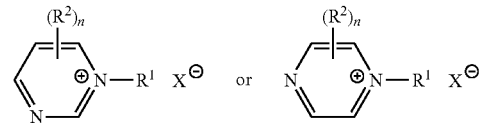

wherein $R^1$ is a $C_1$-$C_{12}$ alkyl group; $R^2$ are each independently a $C_1$-$C_{12}$ alkyl group, n is 0 to 4, and $X^-$ is an anion.

The ionic liquid activator can comprise an ammonium salt and/or a phosphonium salt of the formulas:

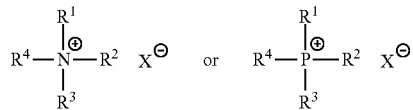

wherein $R^1$, $R^2$, $R^3$, and $R^4$ are each independently a $C_1$-$C_{12}$ alkyl group; and $X^-$ is an anion.

The anion ($X^-$) in the salts described above can comprise, for example, a halide ($F^-$, $Cl^-$, $Br^-$, $I^-$), formate, acetate, nitrate, phosphate, sulfonate, tetrafluoroborate, hexfluorophosphate, triflate (trifluoromethane sulfonate), bis(trifluoromethylsulfonyl)imide, tosylate, an alkyl sulfonate anion (e.g., methyl sulfonate), an alkylsulfate anion, a carboxylate anion, or a phthalate anion.

The ionic liquid activators used in the compositions, coatings, and processes described in this specification can comprise any combination of the above-described cations and anions, and can also comprise combinations of any two or more ionic liquids each independently comprising the above-described cations and anions.

The curable compositions can comprise an activator in amounts, based on total composition weight, ranging from a non-zero amount up to 10%, up to 5%, up to 2%, up to 1%, up to 0.5%, or up to 0.1%, or any sub-range subsumed within such ranges. The activators may be maintained separate from the 1,1-di-activated vinyl compounds or multifunctional forms thereof (e.g., in separate container) until a time sufficiently close to the application of the curable composition over a substrate in order to prevent premature curing of the curable composition. The activator may then be mixed with all of the other components of the curable composition and applied over a substrate using a suitable application technique (e.g., spraying, electrostatic spraying, dipping, rolling, brushing, troweling electrocoating, and the like). In other examples, described below, activators may be applied over and/or under layers of the curable compositions to (1) activate addition reactions between the polyfunctional components and the 1,1-di-activated vinyl compounds or multifunctional forms thereof, and/or (2) activate polymerization reactions among the 1,1-di-activated vinyl compounds or multifunctional forms thereof.

In some examples, an activator may comprise a metal oxide layer on a metallic substrate over which the curable compositions are applied. For example, chromium oxide films on stainless steel substrates, aluminum oxide films on aluminum or aluminum oxide substrates, or titanium oxide films on titanium or titanium alloy substrates can function as activators in coating layers applied over such substrates.

Additional examples of activators and activation methods that can be used in connection with one or more coating layers in the multi-layer coatings are described in U.S. Pat. No. 9,181,365, which is incorporated by reference into this specification.

In some examples, particularly, but not necessarily, where the curable compositions used to form one or more coating layers in the multi-layer coatings comprise both (1) the 1,1-di-activated vinyl compound, or multifunctional form thereof, or combination thereof, and (2) a polyol, polyamine, polythiol, or polycarbamate, or combinations of any thereof, the curable compositions can further comprise an acid promoter. In some examples, the acid promoter can comprise a strong acid. As used in this specification, the term "strong acid" means an acid having a $pK_a$ in water of less than −1.74 and, for protic acids, at least one proton ($H^+$) that completely dissociates in dilute aqueous solution. Strong acid promoters that can be formulated in the curable compositions include, for example, inorganic strong acids and organic strong acids. Suitable inorganic strong acids include, for example, mineral acids (e.g., hydrochloric acid, perchloric acid, sulfuric acid, and nitric acid) and heteropoly acids (e.g., phosphotungstic acid, phosphomolybdic acid, silicotungstic acid, and silicomolybdic acid). Suitable organic strong acids include, for example, sulfonic acids (e.g., p-toluenesulfonic acid, methanesulfonic acid, and dodecylbenzenesulfonic acid). Combinations of any strong acids (e.g., a mixture of a sulfonic acid and a heteropoly acid) may also be formulated in the curable compositions.

Without intending to be bound by any theory, it is believed that acids may function as Lewis acids in the curable compositions and complex to the 1,3-dicarbonyl motif, thereby promoting a Michael addition reaction between the functional groups on polyfunctional components and the vinyl groups on the 1,1-di-activated vinyl compound and/or multifunctional form thereof. Accordingly, a strong acid component in a curable composition may shift the crosslinking and curing reactions away from self-polymerization of the 1,1-di-activated vinyl compound and/or multifunctional form thereof and toward Michael addition reactions forming covalent linkages between the polyfunctional components and the 1,1-di-activated vinyl compound and/or multifunctional form thereof.

In some examples, particularly, but not necessarily, where the curable compositions used to form one or more coating layers in the multi-layer coatings comprise an activator, the curable compositions can further comprise an extender. As used in this specification, the term "extender" means a compound or other agent capable of decreasing the reaction rate of (i) polymerization of 1,1-di-activated vinyl compounds or multifunctional forms thereof and/or (ii) addition reactions between 1,1-di-activated vinyl compounds or multifunctional forms thereof and polyfunctional components (e.g., polyol, polyamine, polythiol, and/or polycarbamate resins or compounds). Accordingly, extenders function to extend the pot life of the curable compositions and can be used in combination with activators and/or acid promoters, as described above, to control the pot life and cure response of the curable compositions used to form one or more coating layers in the multi-layer coatings.

The extenders used in the compositions, coatings, and processes described in this specification can comprise, for example, a carboxylic anhydride compound and/or a carboxylic acid compound. Suitable carboxylic anhydride compounds include, for example, unsaturated anhydrides such as maleic anhydride; citraconic anhydride; itaconic anhydride; aconitic anhydride; bicyclo[2.2.2]oct-7-ene-2,3,5,6-tetracarboxylic dianhydride; crotonic anhydride; 1-cyclopentene-1,2-dicarboxylic anhydride; methacrylic anhydride; or combinations of any thereof. Suitable carboxylic anhydride compounds also include, for example, saturated anhydrides such as the saturated homologues of any of the above-described unsaturated anhydrides (e.g., succinic anhydride). Suitable carboxylic acid compounds include, for example, short-chain (e.g., $C_2$ to $C_{20}$) saturated and unsaturated carboxylic acids such as oxalic acid, acetic acid, propionic acid, octanoic, stearic acid, isostearic acid, benzoic acid, citric acid, (meth)acrylic acid, crotonic acid, isocrotonic acid, vinylacetic acid, 2-pentenoic acid, 3-pentenoic acid, allylacetic acid, maleic acid, fumaric acid, citraconic acid, itaconic acid, aconitic acid, saturated and unsaturated fatty acids (e.g., palmitoleic acid, vaccenic acid, and/or oleic acid), and combinations of any thereof.

Alternatively, or in addition, the extenders used in the compositions, coatings, and processes described in this specification can comprise, for example, an anhydride-containing vinyl polymer and/or a carboxylic acid-containing vinyl polymer. As used in this specification, the term "vinyl polymer" means any polymer produced by addition reactions between carbon-carbon double bonds. Anhydride-containing vinyl polymers can be produced from monomer mixtures comprising an ethylenically unsaturated carboxylic acid anhydride such as, for example, maleic anhydride; citraconic anhydride; itaconic anhydride; aconitic anhydride; bicyclo[2.2.2]oct-7-ene-2,3,5,6-tetracarboxylic dianhydride; crotonic anhydride; 1-cyclopentene-1,2-dicarboxylic anhydride; methacrylic anhydride; or combinations of any thereof. Anhydride-containing vinyl polymers can be produced from monomer mixtures further comprising ethylenically unsaturated monomers such as, for example, styrene and derivatives thereof, vinyl acetate, vinyl chloride, (meth)acrylate esters, and the like. Anhydride-containing vinyl polymers suitable for use as extenders in the compositions, coatings, and processes described in this specification are described, for example, in U.S. Pat. No. 4,798,745 at column 7, line 27 to column 8, line 3, and at column 10, line 40 to column 12, line 59, which is incorporated by reference into this specification.

Carboxylic acid-containing vinyl polymer suitable for use as extenders in the compositions, coatings, and processes described in this specification can be produced from monomer mixtures comprising an ethylenically unsaturated carboxylic acid such as, for example, (meth)acrylic acid, crotonic acid, isocrotonic acid, vinylacetic acid, 2-pentenoic acid, 3-pentenoic acid, allylacetic acid, maleic acid, fumaric acid, citraconic acid, itaconic acid, aconitic acid, saturated and unsaturated fatty acids (e.g., palmitoleic acid, vaccenic acid, and/or oleic acid), and combinations of any thereof. Carboxylic acid-containing vinyl polymers can be produced from monomer mixtures further comprising ethylenically unsaturated monomers such as, for example, styrene and derivatives thereof, vinyl acetate, vinyl chloride, (meth)acrylate esters, and the like. Additionally, vinyl polymers containing both carboxylic acid groups and carboxylic acid anhydride groups can be used as extenders in the compositions, coatings, and processes described in this specification. Such vinyl polymer can be produced from monomer mixtures comprising both an ethylenically unsaturated carboxylic acid and an ethylenically unsaturated carboxylic acid anhydrides, as described above.

In some examples, the curable compositions used to form one or more coating layers in the multi-layer coatings can comprise (1) the 1,1-di-activated vinyl compound, or multifunctional form thereof, or combination thereof, and (2) any combination of an acid promoter, an activator, and/or an extender, as described above. The curable compositions used to form one or more coating layers in the multi-layer coatings can further comprise (3) a polyol, polyamine, polythiol, or polycarbamate, or combinations of any thereof. The curable compositions used to form one or more coating layers in the multi-layer coatings can further comprise additional materials such as additional resins, solvents, reactive diluents, colorants, and the like. As used herein, "colorant" means any substance that imparts color and/or other opacity and/or other visual effect to a curable composition, particularly when applied over a substrate and cured. A colorant can be added to a curable composition in any suitable form, such as discrete particles, dispersions, solutions, and/or flakes. A single colorant or a mixture of two or more colorants can be formulated in a curable composition used to form one or more coating layers in the multi-layer coatings described in this specification.

Example colorants include pigments (organic or inorganic), dyes, and tints, such as those used in the paint industry and/or listed by the Dry Color Manufacturers Association (DCMA), as well as special effect compositions. A colorant may include, for example, a finely divided solid powder that is insoluble, but wettable, under the conditions of use. A colorant can be organic or inorganic and can be agglomerated or non-agglomerated. Colorants can be incorporated into a curablecomposition by use of a grind vehicle, such as an acrylic grind vehicle, the use of which will be familiar to persons skilled in the art.

Example pigments and/or pigment compositions include, but are not limited to, carbazole dioxazine crude pigment, azo, monoazo, diazo, naphthol AS, salt type (flakes), benzimidazolone, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black, and mixtures of any thereof. The terms "pigment" and "colored filler" can be used interchangeably. Example dyes include, but are not limited to, soluble in organic solvents and/or water such as phthalo green or blue, iron oxide, bismuth vanadate, anthraquinone, perylene, and quinacridone.

Example tints include, but are not limited to, pigments dispersed in water-based or water miscible carriers such as AQUA-CHEM 896 (available from Degussa, Inc.), and CHARISMA COLORANTS and MAXITONER INDUSTRIAL COLORANTS (available from the Accurate Dispersions Division of Eastman Chemical Company).

A colorant optionally formulated in a curablecomposition can also comprise a special effect composition or pigment. As used herein, a "special effect composition or pigment" means a composition or pigment that interacts with visible light to provide an appearance effect other than, or in addition to, a continuous unchanging color. Example special effect compositions and pigments include those that produce one or more appearance effects such as reflectance, pearlescence, metallic sheen, texture, phosphorescence, fluorescence, photochromism, photosensitivity, thermochromism, goniochromism, and/or color-change. Examples of special effect compositions can include transparent coated mica and/or synthetic mica, coated silica, coated alumina, aluminum flakes, a transparent liquid crystal pigment, a liquid crystal coating, and combinations of any thereof.

Other examples of materials that can be formulated in a curable composition include plasticizers, abrasion resistant particles, anti-oxidants, hindered amine light stabilizers, UV light absorbers and stabilizers, surfactants, flow and surface control agents, thixotropic agents, solvents and co-solvents, reactive diluents, catalysts, reaction inhibitors, and other customary auxiliaries in the paint and coating industry.

The invention described in this specification includes the use of a curable composition, as described above, to produce a multi-layer coating. For example, a process for coating a substrate can comprise applying a first coating layer over at least a portion of a substrate, applying a second coating layer over at least a portion of the first coating layer, and curing the first coating layer and/or the second coating layer. The curing of the first coating layer and the second coating layer can be performed sequentially or simultaneously with or without intermediate flashing, drying, or dehydrating steps. The first coating layer and the second coating layer both independently comprise a polymeric resin. The first coating layer and/or the second coating layer, when cured, comprise a polymerization reaction product of a 1,1-di-activated vinyl compound, or a multifunctional form thereof, or a combination thereof. The first coating layer and/or the second coating layer, when cured, may also comprise an addition reaction product of a 1,1-di-activated vinyl compound, or a multifunctional form thereof, or a combination thereof and a polyol, polyamine, polythiol, or polycarbamate.

The "Addition Reaction product" refers to the adduct formed by the reaction of 1,1'-di-activated vinyl compound and/or multifunctional form thereof with a nucleophile (such as an amine, thiol or alcohol and/or their polymeric form). Without being bound to any theory, this may be the result of an addition of the nucleophile to the conjugate double bond ('the Michael Addition Reaction'), or displacing the alcohol of the ester of a 1,1-diactivated vinyl ester with a another alcohol (a trans-esterification reaction), an amine, a thiol and/or a polymeric form of them. For example, the reaction of an amine can result in an amide product and the reaction with a thiol can result in a thioester product. A "polymeric addition product" refers to the product of polymerization reaction, wherein a multitude of reactants react repetitively. Without being bound by any theory, this could be done through a variety of reaction mechanisms, such as anionic polymerization, condensation polymerization, chain growth or radical polymerization. For example, a primary amine can react 1,1'-diethyl methylene malonate (DEMM) via anionic polymerization to form polymeric-DEMM.

The first coating layer and/or the second coating layer can comprise a curable composition having, in any combination, any of the features or characteristics described above. For example, the 1,1-di-activated vinyl compound can comprise a methylene dicarbonyl compound, a dihalo vinyl compound, a dihaloalkyl disubstituted vinyl compound, or a cyanoacrylate compound, or a multifunctional form of any thereof, or a combination of any thereof. The curable composition forming a coating layer can include an activator (e.g., an amine such as a tertiary amine like DABCO or DMAE/DMEA, or an ionic liquid). The curable composition forming a coating layer can include a promoter (e.g., a strong acid such as a sulfonic acid and/or a heteropoly acid), particularly in examples further comprising a polyol, polyamine, polythiol, or polycarbamate, which can comprise a polyfunctional polymeric resin or a polyfunctional monomeric compound or a combination thereof. The curable composition forming a coating layer can include an extender (e.g., an anhydride-containing vinyl polymer).

As described above, the curable composition used to form one or more coating layers in the multi-layer coatings can comprise any combination of an acid promoter, an activator compound, and/or an extender. Without intending to be bound by any theory, the presence of an acid promoter and/or an activator compound and/or an extender in a curable composition can influence the final coating properties by modulating the cure kinetics and/or the extent of Michael addition reactions versus self-polymerization of the 1,1-di-activated vinyl compound and/or multifunctional form thereof. In some examples, the acid catalyst can comprise a "strong acid" as described above and/or weaker acids. Suitable weaker acids that can be formulated in the curable compositions include, for example, inorganic weak acids and organic weak acids. In this context, weak acids are defined as having pKa in the range of −1.3 to 7 in water at 25° C. Suitable inorganic weak acids include, for example, sulfamic acid, phosphoric acid, hypochlorous acid, and boric acid. Suitable organic weak acids include, for example, carboxylic acids such as oxalic acid, acetic acid, propionic acid, octanoic, stearic acid, isostearic acid, benzoic acid, and citric acid.

As used in this specification, the terms "cure" and "curing" refer to the progression of a liquid curable composition from the liquid state to a cured state and encompass physical drying of curable compositions through solvent or carrier evaporation (e.g., thermoplastic curable compositions) and/or chemical crosslinking of components in the curable compositions (e.g., thermosetting curable compositions). In this regard, the term "cured," as used in this specification, refers to the condition of a liquid curable composition in which a film or layer formed from the liquid curable composition is at least set-to-touch.

In some examples, the curing of the first coating layer and/or the second coating layer can comprise spraying an activator solution over and/or under at least a portion of the first coating layer and/or the second coating layer. The activator solution can comprise an activator (as described above) dissolved or otherwise dispersed in a liquid carrier. The activator solution can comprise an activator compound such as amine activator (e.g., a tertiary amine compound such as DABCO or DMAE/DMEA) dissolved in an aqueous or organic solvent (e.g., an ester solvent such as n-butyl acetate). The activator solution can be sprayed or otherwise applied over a substrate and a curable composition applied over the pre-applied activator solution. Alternatively, or in addition, the activator solution can be sprayed or otherwise applied over a pre-applied layer or film of a curable composition. The activator solution may initiate polymerization reactions and/or Michael addition reactions at the interface of the applied curable composition layer or film and may migrate into the layer or film to further initiate curing reactions.

In some examples, the curing of the first coating layer may be initiated by activator compounds present in the second coating layer, or the curing of the second coating layer may be initiated by activator compounds present in the first coating layer. For instance, the first coating layer may comprise an activator compound, and the curing of the second coating layer comprises activating a polymerization reaction and/or an addition reaction in the second coating layer with the activator compound in the first coating layer. In this manner, the activator compound in the first coating layer may initiate polymerization reactions and/or Michael addition reactions in the second coating layer at the interface between the two layers. The activator compound in the first coating layer may also migrate through the interface and into the second coating layer to further initiate curing reactions. In this example, the chemical composition of the first coating layer may be such that the activator does not function to initiate crosslinking or other curing reactions in the first coating layer, but does so initiate curing reaction in the second coating layer upon application of the second coating layer over and in direct contact with the first coating layer.

Alternatively, the second coating layer may comprise an activator compound, and the curing of the first coating layer comprises activating a polymerization reaction and/or an addition reaction in the first coating layer with the activator compound in the second coating layer. In this manner, the activator compound in the second coating layer may initiate polymerization reactions and/or Michael addition reactions in the first coating layer at the interface between the two layers. The activator compound in the second coating layer may also migrate through the interface and into the first coating layer to further initiate curing reactions. In this example, the chemical composition of the second coating layer may be such that the activator does not function to initiate crosslinking or other curing reactions in the second coating layer, but does so initiate curing reaction in the first coating layer upon application of the second coating layer over and in direct contact with the first coating layer. The activator present in either the first coating layer or the second coating layer which initiates crosslinking or other curing reactions in the other coating layer can comprise an activator compound such as amine activator (e.g., a tertiary amine compound such as DABCO or DMAE/DMEA).

In some examples, the first coating layer and/or the second coating layer can be applied over at least a portion of a bare substrate or a pre-applied coating (e.g., a primer coating) using application techniques such as spraying, electrostatic spraying, dipping, rolling, brushing, electrocoating, and the like. Once applied, the first coating layer and the second coating layer can be dehydrated and/or cured. As described above, the curing of the first coating layer and the second coating layer can be performed sequentially (i.e., the first coating layer is cured before the application of the second coating layer) or simultaneously with or without intermediate flashing, drying, or dehydrating steps. For example, the first coating layer can be applied and dehydrated, the second coating layer can be applied over the dehydrated first coating layer, and both the first and second coating layers baked or otherwise treated to cure the multi-layer system. The specific curing conditions of the coating layers will be based, at least in part, on the chemical formulation of the curable composition forming the layers. In some examples, the first coating layer and/or the second coating layer can be dehydrated and/or cured, independently or together, at temperatures ranging from ambient temperature (about 20° C. to 25° C.) to 500° C., or any sub-range subsumed therein, for example, from ambient temperatures to 200° C., from ambient temperatures to 150° C., from ambient temperatures to 140° C., from ambient temperatures to 130° C., from ambient temperatures to 120° C., from ambient temperatures to 100° C., from ambient temperatures to 90° C., from ambient temperatures to 80° C., from ambient temperatures to 60° C., or from ambient temperatures to 50° C.

As described above, 1,1-di-activated vinyl compounds and/or multifunctional forms thereof can undergo polymerization reactions (e.g., anionic polymerization initiated by amines or other alkaline activator compounds). Accordingly, after curing, at least one of the cured first coating layer and/or the cured second coating layer may comprise a polymerization reaction product of a 1,1-di-activated vinyl compound and/or a multifunctional forms thereof. The 1,1-di-activated vinyl compound and/or a multifunctional forms thereof may comprise a dialkyl methylene malonate, a diaryl methylene malonate, a multifunctional form of a dialkyl methylene malonate, or a multifunctional form of a diaryl methylene malonate, or a combination of any thereof.

Additionally, as described above, 1,1-di-activated vinyl compounds and/or multifunctional forms thereof can function as crosslinking/curing agents for polyfunctional polymeric resins or polyfunctional monomeric compounds. Again not intending to be bound by any theory, it is believed that the vinyl group(s) in the 1,1-di-activated vinyl compounds and/or the multifunctional forms thereof can react via a Michael addition mechanism with the hydroxyl, amine, mercapto, and/or carbamate groups in polyfunctional polymeric resins or polyfunctional monomeric compounds) and thereby form stable covalent linkages. Accordingly, after curing, at least one of the cured first coating layer and/or the cured second coating layer may comprise a polymerization reaction product and an addition reaction product of (1) a polyol, a polyamine, a polythiol, or a polycarbamate, or a combination of any thereof, and (2) a 1,1-di-activated vinyl compound and/or a multifunctional forms thereof. The 1,1-di-activated vinyl compound and/or a multifunctional forms thereof may comprise a dialkyl methylene malonate, a diaryl methylene malonate, a multifunctional form of a dialkyl methylene malonate, or a multifunctional form of a diaryl methylene malonate, or a combination of any thereof.

In some examples, after curing, at least one of the cured first coating layer and/or the cured second coating layer may comprise a polymerization reaction product of a dialkyl methylene malonate and/or a multifunctional form of dialkyl methylene malonate. The multifunctional form of the dialkyl methylene malonate may comprise a transesterification adduct of a dialkyl methylene malonate and at least one polyol. The transesterification adduct of the dialkyl methylene malonate and the at least one polyol may comprise a transesterification adduct of the dialkyl methylene malonate and a diol (e.g., an alkane diol such as 1,5-pentanediol or 1,6-hexanediol). In some examples, after curing, at least one of the cured first coating layer and/or the cured second coating layer may also comprise an addition reaction product of (1) a polyol, a polyamine, a polythiol, or a polycarbamate, or a combination of any thereof, and (2) a dialkyl methylene malonate and a multifunctional form of a dialkyl methylene malonate. The dialkyl methylene malonate and/or the multifunctional form of the dialkyl methylene malonate may comprise, for example, dimethyl methylene malonate (D3M) or diethyl methylene malonate (DEMM).

The invention described in this specification includes multi-layer coatings comprising a coating layer formed from the curable compositions described above. For example, a multi-layer coating can comprise a first coating layer applied over at least a portion of a substrate, and a second coating layer applied over at least a portion of the first coating layer. The first coating layer and the second coating layer both independently comprise a polymeric resin. The first coating layer and/or the second coating layer can comprise a polymerization reaction product of a 1,1-di-activated vinyl compound, or a multifunctional form thereof, or a combination thereof. The first coating layer and/or the second coating layer may further comprise an addition reaction product of (1) a polyol, a polyamine, a polythiol, or a polycarbamate, or a combination of any thereof, and (2) a 1,1-di-activated vinyl compound, or a multifunctional form thereof, or a combination thereof.

In examples where only the first coating layer or the second coating layer is formed from a curable composition comprising a 1,1-di-activated vinyl compound and/or a multifunctional form thereof (and optionally a polyfunctional resin or compound), the other coating layer can be formed from a different curable composition comprising any useful formulation. Other types of curable compositions than can be used with curable compositions comprising a 1,1-di-activated vinyl compound, or a multifunctional form thereof, or a combination thereof to produce multi-layer coatings include, for example, polyurethane-based coating compositions, polyurea-based coating compositions, acrylic-based coating compositions, epoxy-based coating compositions, polyester-based coating compositions, polyether-based coating compositions, polythioether-based coating compositions, polyamide-based coating compositions, polycarbonate-based coating compositions, polycarbamate-based coating compositions, and aminoplast-based coating compositions (including coating compositions comprising urea-formaldehyde and/or melamine-formaldehyde resins).

In some examples, the first coating layer comprises a thermoset resin comprising polyester resin, polyurethane resin, polyurea resin, polyether resin, polythioether resin, polycarbonate resin, polycarbamate resin, epoxy resin, phenolic resin, or aminoplast resin, or a combination of any thereof, and the second coating layer comprises a polymerization reaction product of a 1,1-di-activated vinyl compound, or a multifunctional form thereof, or a combination thereof. The second coating layer may comprise a clearcoat layer.

Curable composition comprising a 1,1-di-activated vinyl compound, or a multifunctional form thereof, or a combination thereof can be used to form basecoats, topcoats, tiecoats, and the like, in combination with other coating chemistries that form other coating layers in a multi-layer coating system. As used in this specification, the term "basecoat" means a coating layer that is deposited onto a primer and/or directly onto a substrate, optionally including components (such as pigments) that impact the color and/or provide other visual impact. As used in this specification, the term "topcoat" means a coating layer that is deposited over another coating layer such as a basecoat. Topcoats are often, but not always, "clearcoats," which as used in this specification means a coating layer that is at least substantially transparent or fully transparent to visible. As used in this specification, the term "substantially transparent" refers to a coating wherein a surface beyond the coating is at least partially visible to the naked eye when viewed through the coating. As used in this specification, the term "fully transparent" refers to a coating wherein a surface beyond the coating is completely visible to the naked eye when viewed through the coating. It is appreciated that a clearcoat can comprise colorants, such as pigments, provided that the colorants do not interfere with the desired transparency of the clearcoat layer. In some examples, a clearcoat layer is free of added colorants such as pigments. As used in this specification, the term "tiecoat" means a coating layer that is located between two other coating layers, such as, for example, a coating layer located between a basecoat layer and a topcoat layer.

The multi-layer coatings described in this specification can comprise a primer coating layer, which can correspond to a first coating layer. As used in this specification, a "primer coating layer" means an undercoating that may be deposited onto a substrate in order to prepare the surface for application of a protective or decorative coating system. A primer coating layer can be formed over at least a portion of the substrate as a first coating layer and a second coating layer (e.g., a basecoat) can be formed over at least a portion of the primer coating layer. As such, the multi-layer coating of the present invention can comprise a primer coating layer and one or more of a basecoat layer and a topcoat layer.

A first coating layer comprising a primer coating layer can be formed from a coating composition that comprises a film-forming resin such as a cationic based resin, an anionic based resin, and/or any of the additional film-forming resins previously described. The coating composition used to form the primer coating composition can include a corrosion inhibitor, particularly in coating formulations intended for use on metallic substrates. As used in this specification, a "corrosion inhibitor" means a component reduces the rate or severity of corrosion of a surface on a metal or metal alloy substrate. Also, the first coating layer can be a direct gloss coating. A direct gloss coating, in this context, refers to a pigmented top coat layer is either glossy or has a matte finish.

A corrosion inhibitor can include, but is not limited to, an alkali metal component, an alkaline earth metal component, a transition metal component, or combinations of any thereof. The term "alkali metal" refers to an element in Group 1 (International Union of Pure and Applied Chemistry (IUPAC)) of the periodic table of the chemical elements, and includes, e.g., cesium (Cs), francium (Fr), lithium (Li), potassium (K), rubidium (Rb), and sodium (Na). The term "alkaline earth metal" refers to an element of Group 2 (IUPAC) of the periodic table of the chemical elements, and includes, e.g., barium (Ba), beryllium (Be), calcium (Ca), magnesium (Mg), and strontium (Sr). The term "transition metal" refers to an element of Groups 3 through 12 (IUPAC) of the periodic table of the chemical elements, and includes, e.g., titanium (Ti), zirconium (Zr), chromium (Cr), and zinc (Zn), among various others. Examples of inorganic components that can function as corrosion inhibitors in primer coating compositions include magnesium oxide, magnesium hydroxide, magnesium carbonate, magnesium phosphate, magnesium silicate, zinc oxide, zinc hydroxide, zinc carbonate, zinc phosphate, zinc silicate, zinc dust, and combinations thereof.

The components of a primer coating composition can be selected to form an electrodepositable coating composition. As used in this specification, the term "electrodepositable coating composition" refers to a coating composition that is capable of being deposited onto an electrically conductive substrate under the influence of an applied electrical potential. Examples of electrodepositable coating compositions include anionic and cationic electrodepositable coating compositions, such as epoxy or polyurethane-based coatings, such as the electrodepositable coatings described in U.S. Pat. No. 4,933,056 at column 2, line 48 to column 5, line 53; U.S. Pat. No. 5,530,043 at column 1, line 54 to column 4, line 67; U.S. Pat. No. 5,760,107 at column 2, line 11 to column 9, line 60; and U.S. Pat. No. 5,820,987 at column 3, line 48 to column 10, line 63, each of which is incorporated by reference into this specification. Suitable electrodepositable coating compositions also include those commercially available from PPG Industries, Inc., such as the POWERCRON® series of anodic and cathodic epoxy and acrylic coatings, ED-6060C, ED-6280, ED-6465, and ED-7000, for example.

As described above, a primer coating composition can be deposited as a first coating layer directly over at least a portion of a substrate before application of a second coating layer. Alternatively, a first coating layer can be deposited over a cured primer coating layer where the first coating layer functions as a basecoat layer, and a second coating layer deposited over the first coating layer where the second coating layer functions as a topcoat layer or a tiecoat layer (when a subsequent layer is applied over the second coating layer). Once a primer coating composition is applied to at least a portion of a substrate, the primer coating layer can be dehydrated and/or cured before applying an overcoating layer, whether a basecoat or a topcoat. A primer coating composition can be dehydrated and/or cured, for example, at a temperature of 175° C. to 205° C. to form a primer coating layer.

When a curable composition comprising a 1,1-di-activated vinyl compound, or a multifunctional form thereof, or a combination thereof is used to form a basecoat layer or a tiecoat layer, the multi-layer coating can comprise a topcoat layer formed from a different curable composition such as, for example a curable composition formulated to produce an isocyanate-crosslinked polyurethane clearcoat. Additional examples of topcoat layers that can be used with the multi-layer coating of the present invention include those described in U.S. Pat. No. 4,650,718 at column 1, line 62 to column 10, line 16; U.S. Pat. No. 5,814,410 at column 2, line 23 to column 9 line 54; and U.S. Pat. No. 5,891,981 at column 2, line 22 to column 12, line 37, each of which is incorporated by reference into this specification. Suitable topcoat coating compositions that can be used to form a topcoat layer over the coating layers comprising reaction products of a 1,1-di-activated vinyl compound, or a multifunctional form thereof, or a combination thereof, also include those commercially available from PPG Industries, Inc. under the trademarks NCT®, DIAMOND COAT®, and CERAMICLEAR®.

As described above, in the multi-layer coatings of the present invention, at least one of the first coating layer and/or the second coating layer can comprise a polymerization reaction product of the 1,1-di-activated vinyl compound, or a multifunctional form thereof, or a combination thereof. The first coating layer and/or the second coating layer can further comprise an addition reaction product of: (1) a polyol, a polyamine, a polythiol, or a polycarbamate, or a combination of any thereof, and (2) a 1,1-di-activated vinyl compound, or a multifunctional form thereof, or a combination thereof. As described, the 1,1-di-activated vinyl compound can comprise, for example, a methylene dicarbonyl compound, a dihalo vinyl compound, a dihaloalkyl disubstituted vinyl compound, or a cyanoacrylate compound, or a multifunctional form of any thereof, or a combination of any thereof.

In some examples of the multi-layer coating, the first coating layer and/or the second coating layer can comprise a polymerization reaction product of a dialkyl methylene malonate, a diaryl methylene malonate, a multifunctional form of a dialkyl methylene malonate, or a multifunctional form of a diaryl methylene malonate, or a combination of any thereof. For instance, the first coating layer and/or the second coating layer can comprise a polymerization reaction product of diethyl methylene malonate and a multifunctional form of diethyl methylene malonate. The multifunctional form of diethyl methylene malonate can comprise a transesterification adduct of diethyl methylene malonate and at least one polyol. The transesterification adduct of the diethyl methylene malonate and the at least one polyol can comprise a transesterification adduct of diethyl methylene malonate and a diol (e.g., an alkane diol such as 1,5-pentanediol or 1,6-hexanediol).

In some examples of the multi-layer coating, the first coating layer and/or the second coating layer can be formed from a curable composition including a promoter (e.g., a strong acid such as a sulfonic acid and/or a heteropoly acid) and/or an activator (e.g., an amine such as a tertiary amine like DABCO or DMAE/DMEA, or an ionic liquid) and/or an extender (e.g., an anhydride-containing vinyl polymer). In some examples, the first coating layer comprises an activator compound that activated polymerization reactions in the second coating layer when the second coating layer was applied over the first coating layer. In other examples, the second coating layer comprises an activator compound that activated polymerization reactions in the first coating layer when the second coating layer was applied over the first coating layer.

In some examples, the second coating layer comprises a polymerization reaction product of the 1,1-di-activated vinyl compound and/or multifunctional form thereof (and optionally an addition reaction product of a polyfunctional resin or polyfunctional compound and the 1,1-di-activated vinyl compound and/or multifunctional form thereof), and the first coating layer is formed from a curable composition that cures when heated at a temperature of less than 500° C., less than 200° C., less than 150° C., less than 140° C., less than 130° C., less than 120° C., or less than 100° C. The curable composition that forms the first coating layer can comprise, for example, polyurethane-based coating compositions, polyurea-based coating compositions, acrylic-based coating compositions, epoxy-based coating compositions, polyester-based coating compositions, polyether-based coating compositions, polythioether-based coating compositions, polyamide-based coating compositions, polycarbonate-based coating compositions, polycarbamate-based coating compositions, and aminoplast-based coating compositions (including coating compositions comprising urea-formaldehyde and/or melamine-formaldehyde resins). In some examples, the first coating layer is formed from a curable composition that does not comprise (i.e., is substantially free of) melamine resin and formaldehyde condensates. The term "substantially free," as used in this specification, means that the described materials are present, if at all, at incidental impurity levels, generally less than 1000 parts per million (ppm) by weight based on total curable composition weight.

In some examples, the first coating layer comprises a polymerization reaction product of the 1,1-di-activated vinyl compound and/or multifunctional form thereof (and optionally an addition reaction product of the polyfunctional resin or polyfunctional compound and the 1,1-di-activated vinyl compound and/or multifunctional form thereof), and the second coating layer comprises a clearcoat layer (e.g., an isocyanate-crosslinked polyurethane clearcoat layer).

In some examples, the first coating layer comprises a polymerization reaction product of the 1,1-di-activated vinyl compound and/or multifunctional form thereof (and optionally an addition reaction product of the polyfunctional resin or polyfunctional compound and the 1,1-di-activated vinyl compound and/or multifunctional form thereof), wherein the first coating layer is applied directly onto a metallic substrate. The first coating layer applied directly onto a metallic substrate may further comprise a wetting agent. For example, the first coating layer applied directly onto a metallic substrate may further comprise a polysiloxane-based wetting agent, such as, for example, a polyether-modified polydimethylsiloxane (e.g., poly(ethylene oxide)-polydimethylsiloxane and/or poly(propylene oxide)-polydimethylsiloxane).

The multi-layer coatings can be applied to a wide range of substrates including vehicle components and components of free-standing structures such as buildings, bridges, or other civil infrastructures. More specific substrates include, but are not limited to, automotive substrates (e.g., body panels and other parts and components), industrial substrates, aircraft components, watercraft components, packaging substrates (e.g., food and beverage cans), wood flooring and furniture, apparel, electronics (e.g., housings and circuit boards), glass and transparencies, sports equipment (e.g., golf balls, and the like), appliances (e.g., dish washing machines, clothes washing machines, clothes drying machines). Substrates can be, for example, metallic or non-metallic. Metallic substrates include, but are not limited to, tin, steel (including electrogalvanized steel, cold rolled steel, hot-dipped galvanized steel, among others), aluminum, aluminum alloys, zinc-aluminum alloys, steel coated with a zinc-aluminum alloy, and aluminum plated steel. Non-metallic substrates include polymeric, plastic, polyester, polyolefin, polyamide, cellulosic, polystyrene, polyacrylic, poly(ethylene naphthalate), polypropylene, polyethylene, nylon, EVOH, polylactic acid, other "green" polymeric substrates, poly(ethyleneterephthalate) (PET), polycarbonate, polycarbonate acrylobutadiene styrene (PC/ABS), polyamide, wood, veneer, wood composite, particle board, fiberboard, cement, concrete, brick, stone, paper, cardboard, textiles, leather (both synthetic and natural), glass or fiberglass composites, carbon fiber composites, mixed fiber (e.g., fiberglass and carbon fiber) composites, and the like. The substrate can be one that has been already treated in some manner, such as to impart visual and/or color effect, a protective pretreatment or primer coating layer, or other coating layer, and the like.

The present invention further provides an article comprising the multi-layer coatings formed from the curable compositions described in this specification. For example, the multi-layer coatings of the present invention are also suitable for use as packaging coatings. The application of various pretreatments and coatings to packaging is well established. Such treatments and/or coatings, for example, can be used in the case of metal cans, wherein the treatment and/or coating is used to retard or inhibit corrosion, provide a decorative coating, provide ease of handling during the manufacturing process, and the like. Coatings can be applied to the interior of such cans to prevent the contents from contacting the metal of the container. The coatings applied to the interior of metal cans also help prevent corrosion in the headspace of the cans, which is the area between the fill line of the product and the can lid; corrosion in the headspace is particularly problematic with food products having a high salt content. Coatings can also be applied to the exterior of metal cans. Certain coatings of the present invention are particularly applicable for use with coiled metal stock, such as the coiled metal stock from which the ends of cans are made ("can end stock"), and end caps and closures are made ("cap/closure stock"). Since coatings designed for use on can end stock and cap/closure stock are typically applied prior to the piece being cut and stamped out of the coiled metal stock, they are typically flexible and extensible. Coatings for cans subjected to relatively stringent temperature and/or pressure requirements should also be resistant to popping, corrosion, blushing and/or blistering.

Accordingly, the present invention is further directed to a package coated at least in part with any of the multi-layer coatings described above. A "package" is anything used to contain another item, particularly for shipping from a point of manufacture to a consumer, and for subsequent storage by a consumer. A package will be therefore understood as something that is sealed so as to keep its contents free from deterioration until opened by a consumer. Thus, the present "package" is distinguished from a storage container or bakeware in which a consumer might make and/or store food; such a container would only maintain the freshness or integrity of the food item for a relatively short period. A package according to the present invention can be made of metal or non-metal, for example, plastic or laminate, and be in any form. An example of a suitable package is a laminate tube. Another example of a suitable package is a metal can. The term "metal can" includes any type of metal can, container, or any type of receptacle or portion thereof that is sealed by the food/beverage manufacturer to minimize or eliminate spoilage of the contents until such package is opened by the consumer. One example of a metal can is a food can; the term "food can(s)" is used herein to refer to cans, containers or any type of receptacle or portion thereof used to hold any type of food and/or beverage. The term "metal can(s)" specifically includes food cans and also specifically includes "can ends" including "easy open ends," which are typically stamped from can end stock and used in conjunction with the packaging of food and beverages. The term "metal cans" also specifically includes metal caps and/or closures such as bottle caps, screw top caps and lids of any size, lug caps, and the like. The metal cans can be used to hold other items as well, including, but not limited to, personal care products, bug spray, spray paint, and any other compound suitable for packaging in an aerosol can. The cans can include "two piece cans" and "three-piece cans" as well as drawn and ironed one-piece cans; such one piece cans often find application with aerosol products. Packages coated according to the present invention can also include plastic bottles, plastic tubes, laminates and flexible packaging, such as those made from PE, PP, PET and the like. Such packaging could hold, for example, food, toothpaste, personal care products and the like. The coating can be applied to the interior and/or the exterior of the package.

In some examples, the multi-layer coatings prepared and used according to the present invention may be substantially free, may be essentially free, and/or may be completely free of bisphenol A and epoxy compounds derived from bisphenol A ("BPA"), such as bisphenol A diglycidyl ether ("BADGE"). The term "substantially free" as used in this context means the coatings compositions contain less than 1000 parts per million (ppm), "essentially free" means less than 100 ppm, and "completely free" means less than 20 parts per billion (ppb) of any of the above mentioned compounds, derivatives, or residues thereof.

WORKING EXAMPLES

The following working examples are intended to further describe the invention. It is understood that the invention described in this specification is not necessarily limited to the examples described in this section. In particular, the curable compositions of the disclosure may take various forms, including sealants, coatings, adhesives, encapsulants, and potting compositions, as set forth is some of the following examples presented herein.

Example 1A: Coating Layer Comprising 1,1-Di-Activated Vinyl Compound Polymerization Product on Metallic Substrate A 1,1-di-activated vinyl compound (dimethyl methylene malonate) and a polyether-modified polydimethylsiloxane (BYK-333, available from BYK-Chemie GmbH) were added to a 20 milliliter glass vial and stirred under ambient conditions until homogeneous. The dimethyl methylene malonate and the polyether-modified polydimethylsiloxane were combined together in the amounts provided in Table 1 to form a liquid coating composition.

TABLE 1

| Component | Part by weight (grams) |
| --- | --- |
| D3M[1] | 99 |
| BYK-333[2] | 1 |

[1]Dimethyl methylene malonate.
[2]Polyether-modified polydimethylsiloxane available from BYK-Chemie GmbH.

The liquid coating composition was applied directly onto a 4-inch by 12-inch hot-dipped galvanized steel panel (available form ACT Test Panels LLC) using a 1.4 mil wire-round drawdown bar to form a coating layer. The coating layer was tested for film drying and curing properties. Tack-free time was measured as the amount of time required for an applied coating film to achieve a level of dryness, such that, upon the application and removal of a cotton ball, no cotton fibers were transferred to the coating surface. The cotton ball was applied in the following manner:

1. With the substrate panel in a horizontal position, hold a cotton ball approximately 3 inches above and drop the cotton ball onto the applied coating film.
2. Hold the substrate panel coating side up for 5±2 seconds with the cotton ball in contact with the coating film.
3. After the 5±2 seconds, flip the substrate panel coating side down.
    a. If the cotton ball drops off leaving no fibers on the film, the coating is tack-free.
    b. If the cotton ball does not drop off or leaves fibers, repeat steps 1-3 at appropriate time intervals (e.g., every 15 minutes) until coating is tack-free.

The coating layer reached a tack-free state under ambient conditions at a point in time between 15 and 30 minutes after application to the steel panel.

An MEK double rub test was also performed. The MEK double rub test reports the number of double (back-and-forth) rubs, performed by hand with a methyl ethyl ketone (MEK) soaked rag, required to dissolve the applied coating such that the substrate is visible. This MEK double rub test was performed after about 24 hours under ambient conditions measured from the time of coating application. The double rubs were performed up to a maximum number of 100 and discontinued. The coating layer survived the 100 MEK double rubs with no visible damage.

The relatively rapid drying of the applied coating layer and development of MEK solvent resistance indicated that a polymerized and crosslinked film was formed having good intra-film cohesion and adhesion to the underlying steel substrate.

Example 1B: Coating Layer Comprising a 1,1-Di-Activated Vinyl Compound Polymerization Product on Metallic Substrate A 1,1-di-activated vinyl compound (dimethyl methylene malonate) and a polyether-modified polydimethylsiloxane (BYK-333, available from BYK-Chemie GmbH) were added to a 20 milliliter glass vial and stirred under ambient conditions until homogeneous. The dimethyl methylene malonate and the polyether-modified polydimethylsiloxane were combined together in the amounts provided in Table 2 to form a liquid coating composition.

TABLE 2

| Component | Part by weight (grams) |
| --- | --- |
| D3M[1] | 99 |
| BYK-333[2] | 1 |

[1]Dimethyl methylene malonate.
[2]Polyether-modified polydimethylsiloxane available from BYK-Chemie GmbH.

The liquid coating composition was applied directly onto a 4-inch by 12-inch electrogalvanized steel panel (available form ACT Test Panels LLC) using a 1.4 mil wire-round drawdown bar to form a coating layer. The coating layer was tested for film drying and curing properties. Tack-free time was measured as described above in Example 1A. The coating layer reached a tack-free state under ambient conditions at a point in time between 15 and 30 minutes after application to the steel panel. An MEK double rub test was also performed as described above in Example 1A (after about 24 hours under ambient conditions measured from the time of coating application). The coating layer survived the 100 MEK double rubs with no visible damage.

The relatively rapid drying of the applied coating layer and development of MEK solvent resistance indicated that a polymerized and crosslinked film was formed having good intra-film cohesion and adhesion to the underlying steel substrate.

Example 1C: Coating Layer Comprising a 1,1-Di-Activated Vinyl Compound Polymerization Product on Metallic Substrate A 1,1-di-activated vinyl compound (dimethyl methylene malonate) and a polyether-modified polydimethylsiloxane (BYK-333, available from BYK-Chemie GmbH) were added to a 20 milliliter glass vial and stirred under ambient conditions until homogeneous. The dimethyl methylene malonate and the polyether-modified polydimethylsiloxane were combined together in the amounts provided in Table 3 to form a liquid coating composition.

TABLE 3

| Component | Part by weight (grams) |
| --- | --- |
| D3M[1] | 99 |
| BYK-333[2] | 1 |

[1]Dimethyl methylene malonate.
[2]Polyether-modified polydimethylsiloxane available from BYK-Chemie GmbH.

The liquid coating composition was applied directly onto a 4-inch by 12-inch 6022 aluminum alloy panel (available form ACT Test Panels LLC) using a 1.4 mil wire-round drawdown bar to form a coating layer. The coating layer was tested for film drying and curing properties. Tack-free time was measured as described above in Example 1A. The coating layer reached a tack-free state under ambient conditions at a point in time between 15 and 30 minutes after application to the aluminum alloy panel. An MEK double rub test was also performed as described above in Example 1A (after about 24 hours under ambient conditions measured from the time of coating application). The coating layer survived the 100 MEK double rubs with no visible damage.

The relatively rapid drying of the applied coating layer and development of MEK solvent resistance indicated that a polymerized and crosslinked film was formed having good intra-film cohesion and adhesion to the underlying aluminum alloy substrate.

Example 2: Multi-Layer Coating System Comprising 1,1-Di-Activated Vinyl Compound Polymerization Product A pigmented water-borne basecoating composition (Envirobase High Performance T409 (Black), available from PPG Industries, Inc.) was applied over a 4-inch by 12-inch cold-rolled steel substrate panel pre-coated with ED-6060C electrocoat (electrocoat available from PPG Industries, Inc., and substrate panels available in pre-coated form from ACT Test Panels LLC). The basecoat layer was applied under ambient conditions by drawdown over the electrocoat on the substrate panel using a drawdown bar with a 1 mil gap. The applied basecoat layer was allowed to dry for about 10-15 minutes under ambient conditions until a matte appearance was observed.

A second coating composition was immediately applied over the dried basecoat layer to form a second coating layer. The second coating composition comprised a combination of a 1,1-di-activated vinyl compound and a multifunctional form thereof (a mixture of diethyl methylene malonate and a transesterification adduct of diethyl methylene malonate and 1,6-hexanediol, as described in U.S. Publication No. 2014/0329980). The second coating layer was applied under ambient conditions by drawdown over the dried basecoat layer using a drawdown bar with a 3 mil gap. The second coating layer remained visibly glossy and developed a tack-free state under ambient conditions within 5 minutes of application over the basecoat layer (measured using the cotton ball method described above in Example 1A). An MEK double rub test was also performed, as described above in Example 1A, immediately after reaching the tack-free state (about 5 minutes after application of the second coating layer). The second coating layer survived the 100 MEK double rubs with no visible damage.

Prior to the application of the second coating layer, the second coating composition exhibited a water-like viscosity and only gelled when the liquid contacted the underlying basecoat layer. Without intending to be bound by any theory, it is believed that residual amine in the dried basecoat layer functioned as an activator compound that activated anionic polymerization of the diethyl methylene malonate and the transesterification adduct of diethyl methylene malonate and 1,6-hexanediol in the second coating layer.

Example 3: Multi-Layer Coating System Comprising 1,1-Di-Activated Vinyl Compound Polymerization Product A coating composition comprising a combination of a 1,1-di-activated vinyl compound and a multifunctional form thereof (a mixture of diethyl methylene malonate and a transesterification adduct of diethyl methylene malonate and 1,6-hexanediol, as described in U.S. Publication No. 2014/0329980) was applied over a 4-inch by 12-inch cold-rolled steel substrate panel pre-coated with ED-6060C electrocoat (electrocoat available from PPG Industries, Inc., and substrate panels available in pre-coated form from ACT Test Panels LLC). The coating layer was applied under ambient conditions by drawdown over the electrocoat on the substrate panel using a drawdown bar with a 3 mil gap. The coating composition exhibited a water-like viscosity and did not gel when the liquid contacted the underlying electrocoat layer.

Eight (8) grams of an activator solution of 1,4-diazabicyclo[2.2.2]octane (DABCO) in n-butyl acetate (0.3% solution by weight) was spray applied over the coating layer using a SATA Jet 4000 B HVLP with a 1.3 mm nozzle at 10 psi. The coating layer developed a tack-free state immediately upon spraying the activator solution (measured using the cotton ball method described above in Example 1A). An MEK double rub test was also performed, as described above in Example 1A, within 5 minutes of the spraying of the activator solution. The coating layer survived the 100 MEK double rubs with no visible damage.

As described above, before and after the application of the coating layer, the coating composition exhibited a water-like viscosity and only gelled when the activator solution was sprayed over the applied coating layer. Without intending to be bound by any theory, it is believed that the coating layer did not gel upon application because the fully-cured electrocoat on the substrate panel either (1) did not contain any residual amine or other alkaline compounds to activate anionic polymerization of the diethyl methylene malonate and the transesterification adduct of diethyl methylene malonate and 1,6-hexanediol in the second coating layer or (2) any residual amine or other alkaline compounds were insufficiently mobile, possibly due to the crosslinked state of the binder resin in the electrocoat, to migrate to the surface of the cured electrocoat or otherwise contact the coating layer applied over the electrocoat. It is expected, however, that electrodeposited coating compositions containing amine or other alkaline compounds could activate anionic polymerization in coating compositions comprising 1,1-di-activated vinyl compounds and/or multifunctional forms thereof applied over such electrodeposited coating layers before curing of the electrodeposited coating layers.

Example 4A: Multi-Layer Coating System Comprising 1,1-Di-Activated Vinyl Compound Polymerization Product A water-borne basecoat system comprising two coating layers was applied over a 4-inch by 12-inch cold-rolled steel substrate panel pre-coated with ED-6465 electrocoat (electrocoat available from PPG Industries, Inc., and substrate panels available in pre-coated form from ACT Test Panels LLC). The coating layers were applied under controlled conditions of 20-22° C. temperature and 60-65% relative humidity. The first coating layer of the basecoat system (Basecoat A, described below) was sprayed over the electrocoat on the substrate panel using a Binks model 95AR Conventional Air Spray Gun with a 1.8 millimeter nozzle at 60 psi. The first coating layer of the basecoat system was allowed to dry for 5 minutes under ambient conditions.

Basecoat A was a red pigmented basecoat composition, suitable for use as the first basecoat layer in a multi-layer coating system, prepared in the following manner. Components 1-9 listed in Table 4 below were mixed under stirring to form an aqueous phase mixture. The red tint (Component 10) and the white tint (Component 11) were then added to the aqueous phase mixture. Components 12-18 were mixed to form an organic phase mixture and stirred for 15 minutes before being added to the aqueous phase mixture. After mixing the aqueous and organic phase mixtures together, the pH of the combined mixture was adjusted to 8.6 using 50% aqueous dimethylethanolamine. The resulting Basecoat A composition was aged for 24 hours under ambient conditions before viscosity adjustment with demineralized water. The high shear viscosity of the Basecoat A composition was adjusted to 95 cps at 1000 sec-1 using a Brookfield CAP 2000 viscometer with spindle #1.

TABLE 4

| No. | Component | Parts by weight |
|---|---|---|
| | Aqueous Phase Components | |
| 1 | Polyester A[1] | 496.3 |
| 2 | Latex A[2] | 439.2 |
| 3 | Latex B[3] | 577.0 |
| 4 | Demineralized water | 107.0 |
| 5 | Dimethylethanolamine | 1.2 |
| 6 | Byk 348[4] | 2.2 |
| 7 | Byk 032[5] | 16.4 |
| 8 | 2-ethylhexanol | 158.6 |
| 9 | Mineral spirits | 36.5 |
| 10 | Red tint paste[6] | 1270.2 |
| 11 | White tint paste[7] | 3.6 |
| | Organic Phase Ingredients | |
| 12 | Urethane diol[8] | 82.8 |
| 13 | Resimene HM2608[9] | 115.1 |
| 14 | Cymel 1158[10] | 70.5 |
| 15 | Polyester B[11] | 46.1 |
| 16 | 2-ethylhexanol | 23.7 |
| 17 | Ethylene glycol monobutyl ether | 77.1 |
| 18 | Propylene glycol monobutyl ether | 66.4 |

[1]Polyester A was made with 73 parts-by-weight of Empol 1008, 2.6 parts-by-weight of trimellitic anhydride, 5.2 parts-by-weight of dimethylol propionic acid, and 19.1 parts-by-weight of 1,4 cyclohexane dimethanol, and had a weight average molecular weight (Mw) of 24,160 as measured by GPC, an acid value of 15.5, and a solids content of 20% in water.
[2]Latex A was made with 4.1 parts-by-weight dimethylethanolamine, 3.9 parts-by-weight hexanediol diacrylate, 9.7 parts-by-weight 2-ethylhexyl acrylate, 24.9 parts-by-weight methyl methacrylate, 5.9 parts-by-weight dimethylol propionic acid, 5.8 parts-by-weight hydroxyethyl methacrylate, 29.5 parts-by-weight polytetramethylene ether glycol (Mw = 1000), and 16.4 parts-by-weight isophorone diisocyanate, and had a solids content of 37.8% in water.
[3]Latex B was made with 0.2 parts-by-weight dimethyl ethanolamine, 8.8 parts-by-weight acrylamide, 63 parts-by-weight butyl acrylate, 25 parts-by-weight hexanediol diacrylate, 2 parts-by-weight methyl methacrylate, and 1 part-by-weight butyl acrylate, and had a solids content of 31% in water.
[4]Commercially available from Byk Chemie.
[5]Commercially available from Byk Chemie.
[6]Pigment dispersion as described in comparative Example 1 of U.S. Pat. No. 9,040,621.
[7]White tint paste comprising 61% TiO$_2$ dispersed in 9% acrylic polymer blend, and having a solids of 70%.
[8]The urethane diol was made with 70.1 parts-by-weight of polyoxypropylene diamine (Mw = 400) and 29.9 parts-by-weight of ethylene carbonate.
[9]Commercially available from Ineos Melamines.
[10]Commercially available from Allnex.
[11]Polyester B was made with 39.2 parts-by-weight isostearic acid, 23.8 parts-by-weight cyclohexane dicarboxylic acid, 37 parts-by-weight trimethylol propane, and had a number average molecular weight (Mn) of 726 (determined by gel permeation chromatography) and an acid value of 2 (determined by titration), and had a solids content of 90% in xylene.

The second coating layer of the basecoat system (Basecoat B) was sprayed over the dried first coating layer of the basecoat system using a Binks model 95AR Conventional Air Spray Gun with a 1.8 millimeter nozzle at 60 psi. The second coating layer was sprayed in two consecutive coats without any intermediate drying between spray applications. The two coating layers of the basecoat system where then allowed to dry for 5 minutes under ambient conditions and thereafter dehydrated for 7 minutes at 70° C. The film thickness of the basecoat system (both coating layers) after dehydrating was approximately 34-40 micrometers.

Basecoat B was a metallic red pigmented basecoat composition, suitable for use as the second basecoat layer in a multi-layer coating system, prepared in the following manner. Components 1-12 listed in Table 5 below were mixed under stirring to form an aqueous phase mixture. Components 13 and 14 were then mixed separately for about 20 minutes until the mixture was clear and then added to the rest of the aqueous phase components under stirring. Components 15-18 were mixed to form an organic phase mixture and stirred for 15 minutes prior to being added to the aqueous phase mixture. After mixing the aqueous and organic phase mixtures together, the pH of the combined mixture was adjusted to 8.8 using 50% dimethylethanolamine. The resulting Basecoat B composition was aged for 24 hours under ambient conditions before viscosity adjustment with demineralized water. The high shear viscosity of the Basecoat B composition was adjusted to 80 cps at 1000 sec-1 using a Brookfield CAP 2000 viscometer with spindle #1

TABLE 5

| No. | Components | Parts by weight |
|---|---|---|
| | Aqueous Phase Ingredients | |
| 1 | Polyester A | 643.6 |
| 2 | Latex A | 450.7 |
| 3 | Latex C[1] | 290.0 |
| 4 | Demineralized water | 86.7 |
| 5 | Dimethylethanolamine | 3.5 |
| 6 | Byk 348 | 1.46 |
| 7 | Byk 032 | 15.56 |
| 8 | 2-ethylhexanol | 80.3 |
| 9 | Propylene glycol monobutyl ether | 76.4 |
| 10 | Mineral spirits | 119.7 |
| 11 | Red tint paste | 518.3 |
| 12 | Synolox 100-D45[2] | 15.8 |
| 13 | Demineralized water | 583.9 |
| 14 | Laponite RD[3] | 11.7 |
| | Organic Phase Ingredients | |
| 15 | Resimene HM2608 | 221.5 |
| 16 | Aluminium paste[4] | 153.1 |
| 17 | Polyester B | 45.0 |
| 18 | Propylene glycol monobutyl ether | 141.6 |

[1]Latex C was made with 8.8 parts-by-weight of 50% acrylamide, 63 parts-by-weight n-butyl methacrylate, 25.6 parts-by-weight 1,6-hexanediol diacrylate, 1.7 parts-by-weight methyl methacrylate, 0.9 parts-by-weight n-butyl acrylate, and had a solids content of 25% in water.
[2]Polypropylene glycol available from Dow Chemical.
[3]Sodium lithium magnesium silicate available from Southern Clay Products.
[4]TSB 2180A aluminum paste available from Toyal America.

A third coating composition was immediately applied over the dehydrated basecoat system to form a third coating layer. The third coating composition comprised a combination of a 1,1-di-activated vinyl compound and a multifunctional form thereof (a mixture of diethyl methylene malonate and a transesterification adduct of diethyl methylene malonate and 1,6-hexanediol, as described in U.S. Publication No. 2014/0329980). The third coating layer was applied under ambient conditions by drawdown over the dehydrated basecoat layers using a drawdown bar with a 2 mil gap. The substrate panel comprising the two-layer basecoat system and the overlying third coating layer was dried under ambient conditions for 10 minutes. Within 10 minutes of application, the third coating layer reached a tack-free state (measured using the cotton ball method described above in Example 1A).

After the 10 minute flash dry under ambient conditions, the substrate panel comprising the two-layer basecoat system and the overlying third coating layer was baked for 30 minutes at 150° C. to cure the two-layer basecoat system. An MEK double rub test was performed, as described above in Example 1A, on the cured multi-layer coating system. The third coating layer (i.e., the topmost layer of the multi-layer coating system) survived the 100 MEK double rubs with no visible damage or decrease in visible gloss.

Prior to the application of the third coating layer, the third coating composition exhibited a water-like viscosity and only gelled when the liquid contacted the underlying basecoat layers. Without intending to be bound by any theory, it is believed that residual dimethylethanolamine in the dried basecoat layers functioned as an activator compound that activated anionic polymerization of the diethyl methylene malonate and the transesterification adduct of diethyl methylene malonate and 1,6-hexanediol in the second coating layer.

Example 4B: Comparative Multi-Layer Coating System

Example 4A was repeated but the two-layer basecoat system was baked and cured before application of the third coating layer. More specifically, a water-borne basecoat system comprising two coating layers was applied over a 4-inch by 12-inch cold-rolled steel substrate panel pre-coated with ED-6465 electrocoat (electrocoat available from PPG Industries, Inc., and substrate panels available in pre-coated form from ACT Test Panels LLC). The coating layers were applied under controlled conditions of 20-22° C. temperature and 60-65% relative humidity. The first coating layer of the basecoat system (Basecoat A from Example 4A) was sprayed over the electrocoat on the substrate panel using a Binks Model 95AR Conventional Air Spray Gun with a 1.8 millimeter nozzle at 60 psi. The first coating layer of the basecoat system was allowed to dry for 5 minutes under ambient conditions.

The second coating layer of the basecoat system (Basecoat B from Example 4A) was sprayed over the dried first coating layer of the basecoat system using a Binks Model 95AR Conventional Air Spray Gun with a 1.8 millimeter nozzle at 60 psi. The second coating layer was sprayed in two consecutive coats without any intermediate drying between spray applications. The two coating layers of the basecoat system where then allowed to dry for 5 minutes under ambient conditions and thereafter dehydrated for 7 minutes at 70° C. The film thickness of the basecoat system (both coating layers) after dehydrating was approximately 34-40 micrometers. After the seven minute dehydration, the substrate panel comprising the two-layer basecoat system was baked for 30 minutes at 150° C. to cure the two-layer basecoat system.

A third coating composition was applied over the cured basecoat system to form a third coating layer. The third coating composition comprised a combination of a 1,1-di-activated vinyl compound and a multifunctional form thereof (a mixture of diethyl methylene malonate and a transesterification adduct of diethyl methylene malonate and 1,6-hexanediol, as described in U.S. Publication No. 2014/0329980). The third coating layer was applied under ambient conditions by drawdown over the cured basecoat layers using a drawdown bar with a 2 mil gap. The third coating layer did not gel and remained in a liquid state indefinitely after application to the cured basecoat system.

Without intending to be bound by any theory, it is believed that during the 30 minute, 150° C. bake to cure the two-layer basecoat system, the dimethylethanolamine in the basecoat layers likely volatilized and evaporated from the basecoat system. Additionally, any residual dimethylethanolamine present in the cured basecoat system after the bake was either (1) present in insufficient quantities to activate anionic polymerization of the diethyl methylene malonate and the transesterification adduct of diethyl methylene malonate and 1,6-hexanediol in the third coating layer or (2) insufficiently mobile, possibly due to the crosslinked state of the binder resin in the system, to migrate to the surface of the cured basecoat system or otherwise contact the subsequently applied third coating layer. Thus, the curing (crosslinking) of the basecoat system before the application of the third coating layer prevented the dimethylethanolamine in the basecoating compositions from functioning as an activator compound to activate anionic polymerization of the diethyl methylene malonate and the transesterification adduct of diethyl methylene malonate and 1,6-hexanediol in the third coating layer.

Example 5A: Multi-Layer Coating System Comprising 1,1-Di-Activated Vinyl Compound Polymerization Product A low-temperature cure basecoat was applied over 4-inch by 12-inch cold-rolled steel substrate panels pre-coated with ED-6465 electrocoat (electrocoat available from PPG Industries, Inc., and substrate panels available in pre-coated form from ACT Test Panels LLC). The basecoat composition was prepared with the components listed in Table 6.

TABLE 6

| Component | Part by weight (grams) |
| --- | --- |
| Latex[1] | 196.62 |
| Adipic acid dihydrazide | 2.41 |
| CARBODILITE ® V-02-L2[2] | 9.88 |
| Black tint[3] | 50.48 |
| Red tint[4] | 15.95 |
| BYK ® 348[5] | 0.43 |
| BYK ® 032[6] | 1.73 |
| BYKETOL ® WS[7] | 11.12 |
| SURFYNOL ® 104E[8] | 11.38 |
| Deionized water | 53.00 |

[1]Described below.
[2]Waterborne carbodiimide crosslinker with a hydrophilic segment, commercially available from GSI Exim America, Inc.
[3]Black tint paste consisting of 6% carbon black dispersed in 15% acrylic polymer and having a solids content of 22%.
[4]Red tint paste consisting of 13% transparent iron oxide red dispersed in 13% acrylic polymer and having a solids content of 27%.
[5]Polyether modified siloxane, available from BYK-Chemie GmbH.
[6]Emulsion of paraffin-based mineral oils and hydrophobic components, available from BYK-Chemie GmbH.
[7]Silicone-free surface additive, available from BYK-Chemie GmbH.
[8]Surfactant, available from Air Products and Chemicals, Inc.

The basecoat composition was prepared by mixing the components listed in Table 6 with a conventional stir blade while preventing foaming and air entrapment. The latex component was prepared beforehand as follows:

First, a polyurethane was prepared by charging the components listed in Table 7 into a four necked round bottom flask fitted with a thermocouple, mechanical stirrer, and condenser.

TABLE 7

| Component | Part by weight (grams) |
| --- | --- |
| butyl acrylate | 538 |
| FOMREZ ® 66-56[1] | 433 |
| POLYMEG ® 2000 polyol[2] | 433 |
| 2,6-di-tert-butyl 4-methyl phenol | 3.1 |
| hydroxyethyl methacrylate (HEMA) | 41.4 |
| dimethylol propionic acid (DMPA) | 140 |
| triethylamine | 6.3 |

[1]Hydroxyl-terminated, saturated linear polyester polyol, available from Chemtura Corp.
[2]Polytetramethylene ether glycol, available from LyondellBasell Industries N. V.

The mixture was heated to 50° C. and held for 15 minutes. Next, 601.0 parts-by-weight (grams) of isophorone diisocyanate was charged into the flask over 10 minutes, and mixed for 15 minutes. After mixing, 39 parts-by-weight (grams) of butyl acrylate and 1.6 parts-by-weight (grams) of dibutyl tin dilaurate (DBTDL) was charged into the flask and immediate exotherm was observed. After exotherm subsided, the mixture was heated to 90° C. and held for 60 minutes. The mixture was cooled to 70° C. and 538 grams of butyl acrylate and 94.0 grams of hexanediol diacrylate were charged into the flask. The resulting mixture was kept at 60° C. before being dispersed into water and then allowed to cool to ambient temperature to provide the polyurethane product.

The polyurethane product was used to produce the latex. The latex comprised polyurethane-acrylic shell-core particles with urea linkages, urethane linkages, pendant carboxylic acid functionality, and pendant keto functionality on the polyurethane shell. The latex was prepared by charging the components listed in Table 8 into a four necked round bottom flask fitted with a thermocouple, mechanical stirrer, and condenser.

TABLE 8

| Component | Part by weight (grams) |
| --- | --- |
| Deionized water | 2400.0 |
| diacetone acrylamide | 215 |
| dimethyl ethanolamine | 88 |
| ethylenediamine | 50 |

The mixture was heated to 70° C. and held for two hours with an $N_2$ blanket. After heating the mixture, 1925 parts-by-weight (grams) of deionized water and 40 parts-by-weight (grams) of AEROSOL® OT-75 (a surfactant, available from Cytec Solvay Group) were charged into the flask and held at 50° C. for 15 minutes. Next, 2600.0 parts-by-weight (grams) of the polyurethane product described above was dispersed into the flask over 20 minutes and mixed for an additional 15 minutes. A mixture of 7.7 parts-by-weight (grams) of ammonium persulfate and 165 parts-by-weight (grams) of deionized water was then charged into the flask over 15 minutes. The temperature rose from 50° C. to 80° C. due to polymerization exotherm. The mixture was held at 75° C. for an additional hour. After cooling to 40° C., 1.2 parts-by-weight (grams) of FOAMKILL® 649 (non-silicone defoamer, available from Crucible Chemical Company), 25 parts-by-weight (grams) of ACTICIDE® MBS (a microbiocide comprising a mixture of 1,2-benzisothiazolin-3-one and 2-methyl-4-isothiazolin-3-one, available from Thor GmbH), and 55 parts-by-weight (grams) of deionized water were charged into the flask and mixed for an additional 15 minutes. The resulting latex had a solids content of 38.6% and an average particle size of 60 nm. The average particle size was determined with a Zetasize 3000HS following the instructions in the Zetasize 3000HS manual.

A layer of the basecoat composition (Table 4, above) was applied under ambient conditions by drawdown over the electrocoat on the substrate panels using a drawdown bar with a 1 mil gap. The applied basecoat layers were dehydrated for 5 minutes at 80° C. The resulting layers had dry film thicknesses of about 27 micrometers.

A second coating composition was applied over the dehydrated basecoat layers to form second coating layers over each panel. The second coating composition comprised a combination of a 1,1-di-activated vinyl compound and a multifunctional form thereof (a mixture of diethyl methylene malonate and a transesterification adduct of diethyl methylene malonate and 1,6-hexanediol, as described in U.S. Publication No. 2014/0329980). The second coating layers were applied under ambient conditions by drawdown over the dehydrated basecoat layers using a drawdown bar with 2 mil and 4 mil gaps (corresponding to dry film thicknesses of about 30-40 micrometers and 50-60 micrometers, respectively).

The cure response of the second coating layers was monitored under ambient conditions by measuring the time from application until the layers were dry-to-touch (determined by manually touching the second coating layers with a gloved finger). Both the 30-40 µm DFT and the 50-60 µm DFT layers achieved a dry-to-touch state under ambient conditions between 30-45 minutes after application. Additionally, beginning at 60 minutes after the application of the second coating layers, the coating hardness was measured using a standard HM2000 Fischer MicroHardness tester. The results are reported in Table 9 (hardnesses reported in units of $N/mm^2$).

TABLE 9

| Time (from application) | 30-40 µm DFT layer | 50-60 µm DFT layer |
| --- | --- | --- |
| 10 minutes | wet | wet |
| 20 minutes | wet | wet |
| 30 minutes | less wet | less wet |
| 45 minutes | dry | dry |
| 60 minutes | dry | dry |
|  | 19 $N/mm^2$ | 37 $N/mm^2$ |
| 180 minutes | 25 $N/mm^2$ | 52 $N/mm^2$ |
| 3 days | 66 $N/mm^2$ | 107 $N/mm^2$ |
| 4 days | 75 $N/mm^2$ | 111 $N/mm^2$ |
| 5 days | 76 $N/mm^2$ | 112 $N/mm^2$ |

A methyl ethyl ketone solvent double rub test was also performed, as described above in Example 1A, 60 minutes after application of the second coating layers. The second coating layer survived the 100 methyl ethyl ketone double rubs with no visible damage. An acetone solvent double rub test was also performed 5 days after application of the second coating layer (the acetone double rub test was analogous to the methyl ethyl ketone double rub test, only acetone was used instead of methyl ethyl ketone). The second coating layer survived the 100 acetone double rubs with no visible damage.

Example 5B: Comparative Multi-Layer Coating System

Example 5A was repeated but the coating composition comprising a mixture of diethyl methylene malonate and a transesterification adduct of diethyl methylene malonate and 1,6-hexanediol was applied directly over 4-inch by 12-inch cold-rolled steel substrate panels pre-coated with ED-6670 electrocoat (electrocoat available from PPG Industries, Inc., and substrate panels available in pre-coated form from ACT Test Panels LLC). No intermediate basecoat was applied between the electrocoat layer and the coating layer comprising the mixture of diethyl methylene malonate and a transesterification adduct of diethyl methylene malonate and 1,6-hexanediol. The applied coating layer remained in a liquid state after five days from application.

Without intending to be bound by any theory, it is believed that residual amine (e.g., dimethylethanolamine) in the dehydrated basecoat layers in Example 5A functioned as an activator compound that activated anionic polymerization of the diethyl methylene malonate and the transesterification adduct of diethyl methylene malonate and 1,6-hexanediol in the second coating layer. In Example 5B, however, the cured electrocoat layer did not contain sufficient amounts of and/or sufficiently mobile amine compounds to activate anionic polymerization in the overlying coating layer.

Example 6: Curable Compositions Comprising a 1,1-Di-Activated Vinyl Compound and an Ionic Liquid Activator, Optionally a Polythiol, and Optionally an Extender A composition was provided comprising a 1,1-di-activated vinyl compound and a multifunctional form thereof (a combination of diethyl methylene malonate and a transesterification adduct of diethyl methylene malonate and 1,6-hexanediol). An ionic liquid was provided comprising an alkylimidazolinium phthalate. A tetrafunctional polythiol was provided comprising pentaerythritol tetra(3-mercaptopropionate). An extender was provided comprising a vinyl polymer prepared using an ethylenically unsaturated carboxylic acid anhydride. The crosslinker composition (or unreacted diethyl methylene malonate), the ionic liquid, the polythiol, and the extender were combined together in the amounts provided in Table 10 to form curable compositions.

TABLE 10

| Sample | Crosslinker Composition[1] (g) | DEMM[2] (g) | Ionic Liquid[3] (g) | Polythiol[4] (g) | Extender[5] (g) |
| --- | --- | --- | --- | --- | --- |
| A | — | 2.0 | 0.03 | — | — |
| B | 2.0 | — | 0.04 | — | — |
| C | — | 2.0 | 0.07 | — | 1.00 |
| D | 2.0 | — | 0.09 | — | 0.50 |
| E | 2.0 | — | — | 1.39 | — |
| F | 2.0 | — | 0.02 | 1.39 | — |
| G | 2.0 | — | 0.07 | 1.39 | 1.00 |

[1]A mixture of diethyl methylene malonate and a transesterification adduct of diethyl methylene malonate and 1,6-hexanediol, as described in U.S. Publication No. 2014/0329980.
[2]Unreacted diethyl methylene malonate (monomeric).
[3]An alkylimidazolinium phthalate, available as IL-002 from Sanyo Chemical Industries, Ltd.
[4]Pentaerythritol tetra(3-mercaptopropionate), available as THIOCURE ® PETMP, available from Bruno Bock Chemische Fabrik GmbH & Co KG.
[5]Example 1 in U.S. Pat. No. 4,798,745, column 10, line 40-column 11, line, 22, incorporated by reference into this specification.

The components of the curable compositions listed in Table 10 were mixed together in vials at room temperature. The curable compositions were evaluated for gel time, and select formulations were evaluated for coating film drying and curing properties (tack-free time) and solvent resistance (MEK double rub test). Gel time was measured as the time elapsed after combining all ingredients until the composition did not demonstrate a visually observable flow when the vial containing the composition was inverted.

Coating films were prepared by applying the curable compositions listed in Table 10 over 10.16 cm by 30.18 cm cold-rolled steel substrate panels pre-coated with ED-6060 electrocoat (electrocoat available from PPG Industries, Inc., and substrate panels available in pre-coated form from ACT Test Panels LLC). The coatings were applied immediately upon mixing by drawdown over the electrocoat on the substrate panels using a drawdown bar with a 2-4 mil gap (50-102 micrometers). Tack-free time was measured as the amount of time required for a coating to achieve a level of dryness such that upon the application and removal of a cotton ball no cotton fibers were transferred to the coating surface. MEK double rubs (MEK DR) are reported as the number of double rubs performed by hand with a methyl ethyl ketone soaked rag required to dissolve the coating such that the substrate is visible, up to a maximum number of 100 MEK DR. The gel time, tack-free time, and MEK DR results are reported in Table 11.

TABLE 11

| Sample | Gel Time | Tack-Free Time (ambient temperature) | Tack-Free Time (after 60° C. bake for 10 minutes) | MEK DR |
| --- | --- | --- | --- | --- |
| A | 3 min. | 3 min. | — | — |
| B | 6 min. | 7 min. | — | — |
| C | >1 hour | >1 hour | 0 min. | 0 |
| D | 30 min. | — | 0 min. | 100 |
| E | 3 hour | >3 hour | — | — |
| F | <1 min. | — | — | — |
| G | 10 min. | >1 hour | — | — |

The gel time and tack-free time of Samples A and B show that the ionic liquid was effective at polymerizing the DEMM and the crosslinker composition both in the vial and as a coating film applied onto a panel. It is noted that the short gel time and tack-free time of Samples A and B indicate rapid polymerization of the DEMM or DEMM crosslinker. Sample C was similar to Sample A but it further comprised the extender, which provided for a longer gel time and tack-free time at ambient conditions. Upon a brief bake (60° C. for 10 minutes), Sample C formed a tack-free coating, but did not survive any MEK DR, which was unsurprising because the reaction product is believed to be an un-crosslinked linear polymer formed from anionic polymerization of the DEMM monomer. Sample D was similar to Sample B but it further comprised the extender, which provided for a longer gel time and tack-free time at ambient conditions. Upon a brief bake (60° C. for 10 minutes), Sample D formed a tack-free coating that survived 100 MEK DR, indicating it formed a solvent-resistant cross-linked coating.

Sample E, which contained no ionic liquid, exhibited a relatively slow reaction of the crosslinker composition and the polythiol as indicated by the long gel time and tack-free time. Sample F, which was is similar to Sample E but contained added ionic liquid, exhibited a substantially faster reaction as indicated by the gel time under one minute. In fact, the reaction of Sample F upon initial mixing was so fast that it was not possible to apply the composition as a coating film on a substrate panel before the composition was too viscous to apply. Sample G was similar to Sample F but further comprised added extender. The addition of the extender resulted in an intermediate gel time of 10 minutes, as compared to over 3 hours for Sample E and less than one minute for Sample F, which provides a more practical pot life for the composition.

These examples demonstrate the utility of ionic liquid for activating the cure of 1,1-di-activated vinyl compounds and multifunctional forms thereof, alone or in combination with polyfunctional materials such as polyols, polyamines, polythiols, and/or polycarbamates. The use of an extender to control the reaction rate was also demonstrated, thereby providing control over pot life and cure response, and facilitating longer gel times that extend the usable application time of the compositions while still maintaining reasonably fast curing kinetics.

ASPECTS OF THE INVENTION

Aspects of the invention include, but are not limited to, the following numbered clauses.

1. A multi-layer curable composition comprising: a first curable composition layer applied over at least a portion of a substrate; and a second curable composition layer applied over at least a portion of the first curable composition layer; wherein the first curable composition layer and the second curable composition layer both independently comprise a polymeric resin; and wherein the first curable composition layer and/or the second curable composition layer, when cured, comprise a polymerization reaction product of a 1,1-di-activated vinyl compound, or a multifunctional form thereof, or a combination thereof.

2. The multi-layer curable composition of clause 1, wherein the 1,1-di-activated vinyl compound comprises a methylene dicarbonyl compound, a dihalo vinyl compound, a dihaloalkyl disubstituted vinyl compound, or a cyanoacrylate compound, or a multifunctional form of any thereof, or a combination of any thereof.

3. The multi-layer curable composition of clause 1 or clause 2, wherein the first curable composition layer and/or the second curable composition layer, when cured, comprise a polymerization reaction product of a dialkyl methylene malonate, a diaryl methylene malonate, a multifunctional form of a dialkyl methylene malonate, or a multifunctional form of a diaryl methylene malonate, or a combination of any thereof.

4. The multi-layer curable composition of clause 3, wherein the first curable composition layer and/or the second curable composition layer, when cured, comprise a polymerization reaction product of diethyl methylene malonate and a multifunctional form of diethyl methylene malonate, wherein the multifunctional form of diethyl methylene malonate comprises a transesterification adduct of diethyl methylene malonate and at least one polyol.

5. The multi-layer curable composition of clause 4, wherein the transesterification adduct of diethyl methylene malonate and at least one polyol comprises a transesterification adduct of diethyl methylene malonate and a diol.

6. The multi-layer curable composition of clause 5, wherein the diol comprises 1,5-pentane diol and/or 1,6-hexanediol.

7. The multi-layer curable composition of any one of clauses 1-6, wherein: (i) the first curable composition layer comprises an activator compound that activated polymerization reactions in the second coating layer when the second coating layer was applied over the first coating layer; or (ii) the second curable composition layer comprises an activator compound that activates polymerization reactions in the first coating layer upon application of the second curable composition over the first curable composition layer.

8. The multi-layer curable composition of clause 7, wherein the activator compound comprises a tertiary amine compound.

9. The multi-layer curable composition of clause 8, wherein the activator compound comprises 2-(dimethylamino)ethanol and/or 1,4-diazabicyclo[2.2.2]octane.

10. The multi-layer curable composition of clause 7, wherein the activator compound comprises an ionic liquid.

11. The multi-layer curable composition of any one of clauses 1-10, wherein the first curable composition layer comprises a curable composition that cures when heated at a temperature of less than 500° C., and wherein the second curable composition layer comprises the polymerization reaction product.

12. The multi-layer curable composition of any one of clauses 1-11, wherein the first coating layer does not comprise melamine resin or formaldehyde condensates.

13. The multi-layer coating of any one of clauses 1-11, wherein the first curable composition layer comprises a thermoset resin comprising acrylic resin, polyester resin, polyurethane resin, polyurea resin, polyether resin, polythioether resin, polycarbonate resin, polycarbamate resin, epoxy resin, phenolic resin, or aminoplast resin, or a combination of any thereof, and wherein the second curable composition layer comprises a clearcoat layer comprising the polymerization reaction product.

14. The multi-layer coating of any one of clauses 1-12, wherein the first curable composition layer comprises the polymerization reaction product, and wherein the first curable composition layer is applied directly onto a metallic substrate.

15. The multi-layer curable composition of clauses 1-12, wherein the first curable composition layer comprises the polymerization reaction product, and wherein the first curable composition layer is applied directly onto a non-metallic substrate.

16. The substrate of clauses 1-15, wherein the substrate is polymeric.

17. The substrate of clauses 1-16, where in the non-metallic substrate is an automobile component.

18. The multi-layer coating of any one of clauses 1-13, wherein the substrate comprises an electrodeposited curable composition layer and the first curable composition layer is applied over the electrodeposited coating layer.

19. The multi-layer curable composition of any one of clauses 1-18, wherein the curable composition layer comprising the polymerization reaction product of the 1,1-di-activated vinyl compound, or multifunctional form thereof, or combination thereof, further comprises an extender.

20. The multi-layer curable composition of clause 19, wherein the extender comprises an anhydride-containing vinyl polymer.

21. The multi-layer curable composition of clause 20, wherein the anhydride-containing vinyl polymer comprises maleic anhydride monomer residues.

22. An article comprising the multi-layer curable composition of any one of clauses 1-21 deposited over a surface of the article.

23. The article of clause 22, wherein the article comprises a vehicle component or a free-standing structure.

24. A process for curable composition a substrate comprising: applying a first curable composition layer over at least a portion of a substrate; applying a second curable composition layer over at least a portion of the first curable composition layer; and curing the first curable composition layer and/or the second curable composition layer; wherein the first curable composition layer and the second curable composition layer both independently comprise a polymeric resin; and wherein the first curable composition layer and/or the second curable composition layer, when cured, comprise a polymerization reaction product of a 1,1-di-activated vinyl compound, or a multifunctional form thereof, or a combination thereof.

25. The process of clause 24, wherein the 1,1-di-activated vinyl compound comprises a methylene dicarbonyl compound, a dihalo vinyl compound, a dihaloalkyl disubstituted vinyl compound, or a cyanoacrylate compound, or a multifunctional form of any thereof, or a combination of any thereof.

26. The process of clause 24 or clause 25, wherein the curing of the first curable composition layer and/or the second curable composition layer comprises spraying an activator solution over and/or under at least a portion of the first curable composition layer and/or the second curable composition layer.

27. The process of clause 26, wherein the activator solution comprises a tertiary amine compound.

28. The process of clause 27, wherein the activator solution comprises 1,4-diazabicyclo[2.2.2]octane and/or 2-(dimethylamino)ethanol.

29. The process of any one of clauses 24-28, wherein: (i) the first curable composition layer comprises an activator compound, and wherein the curing of the second curable composition layer comprises activating a polymerization reaction in the second curable composition layer with the activator compound in the first curable composition layer; or (ii) the second curable composition layer comprises an activator compound, and wherein the curing of the first curable composition layer comprises activating a polymerization reaction in the first curable composition layer with the activator compound in the second curable composition layer.

30. The process of clause 29, wherein the activator compound comprises a tertiary amine compound.

31. The process of clause 30, wherein the activator compound comprises 2-(dimethylamino)ethanol and/or 1,4-diazabicyclo[2.2.2]octane.

32. The process of clause 29, wherein the activator compound comprises an ionic liquid.

33. The process of any one of clauses 24-32, wherein at least one of the first curable composition layer and/or the second curable composition layer, when cured, comprises a polymerization reaction product of a dialkyl methylene malonate, a diaryl methylene malonate, a multifunctional form of a dialkyl methylene malonate, or a multifunctional form of a diaryl methylene malonate, or a combination thereof.

34. The process of clause 33, wherein the first curable composition layer and/or the second curable composition layer comprises a polymerization reaction product of diethyl methylene malonate and a multifunctional form of diethyl methylene malonate, wherein the multifunctional form of diethyl methylene malonate comprises a transesterification adduct of diethyl methylene malonate and at least one polyol.

35. The process of clause 34, wherein the transesterification adduct of diethyl methylene malonate and at least one polyol comprises a transesterification adduct of diethyl methylene malonate and a diol.

36. The process of any one of clauses 24-35, wherein the first curable composition layer comprises a curable composition that cures when heated at a temperature of less than 500° C., and wherein the second curable composition layer comprises the polymerization reaction product 37. The process of any one of clauses 24-36, wherein the first curable composition layer does not comprise melamine resin or formaldehyde condensates.

38. The process of any one of clauses 24-37, wherein the first curable composition layer, when cured, comprises a thermosetting resin comprising acrylic resin, polyester resin, polyurethane resin, polyurea resin, polyether resin, polythioether resin, polycarbonate resin, polycarbamate resin, epoxy resin, phenolic resin, or aminoplast resin, or a combination of any thereof, and wherein the second curable composition layer, when cured, comprises a clearcoat layer comprising the reaction product.

39. The process of any one of clauses 24-37, wherein the first curable composition layer, when cured, comprises the polymerization reaction product, and wherein the first curable composition layer is applied directly onto a metallic substrate.

40. The process of any one of clauses 24-38, wherein the substrate comprises an electrodeposited curable composition layer and the first coating layer is applied over the electrodeposited curable composition layer.

41. The process of any one of clauses 24-40, wherein the curable composition layer comprising the polymerization reaction product of the 1,1-di-activated vinyl compound, or multifunctional form thereof, or combination thereof, further comprises an extender.

42. The process of clause 41, wherein the extender comprises an anhydride-containing vinyl polymer.

43. The process of clause 42, wherein the anhydride-containing vinyl polymer comprises maleic anhydride monomer residues.

Various features and characteristics are described in this specification to provide an understanding of the composition, structure, production, function, and/or operation of the invention, which includes the disclosed compositions, coatings, and processes. It is understood that the various features and characteristics of the invention described in this specification can be combined in any suitable manner, regardless of whether such features and characteristics are expressly described in combination in this specification. The Inventors and the Applicant expressly intend such combinations of features and characteristics to be included within the scope of the invention described in this specification. As such, the claims can be amended to recite, in any combination, any features and characteristics expressly or inherently described in, or otherwise expressly or inherently supported by, this specification. Furthermore, the Applicant reserves the right to amend the claims to affirmatively disclaim features and characteristics that may be present in the prior art, even if those features and characteristics are not expressly described in this specification. Therefore, any such amendments will not add new matter to the specification or claims, and will comply with written description, sufficiency of description, and added matter requirements, including the requirements under 35 U.S.C. § 112(a) and Article 123(2) EPC.

Any numerical range recited in this specification describes all sub-ranges of the same numerical precision (i.e., having the same number of specified digits) subsumed within the recited range. For example, a recited range of "1.0 to 10.0" describes all sub-ranges between (and including) the recited minimum value of 1.0 and the recited maximum value of 10.0, such as, for example, "2.4 to 7.6," even if the range of "2.4 to 7.6" is not expressly recited in the text of the specification. Accordingly, the Applicant reserves the right to amend this specification, including the claims, to expressly recite any sub-range of the same numerical precision subsumed within the ranges expressly recited in this specification. All such ranges are inherently described in this specification such that amending to expressly recite any such sub-ranges will comply with written description, sufficiency of description, and added matter requirements, including the requirements under 35 U.S.C. § 112(a) and Article 123(2) EPC. Also, unless expressly specified or otherwise required by context, all numerical parameters described in this specification (such as those expressing values, ranges, amounts, percentages, and the like) may be read as if prefaced by the word "about," even if the word "about" does not expressly appear before a number. Additionally, numerical parameters described in this specification should be construed in light of the number of reported significant digits, numerical precision, and by applying ordinary rounding techniques. It is also understood that numerical parameters described in this specification will necessarily possess the inherent variability characteristic of the underlying measurement techniques used to determine the numerical value of the parameter.

The invention(s) described in this specification can comprise, consist of, or consist essentially of the various features and characteristics described in this specification. The terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. Thus, a composition, coating, or process that "comprises," "has," "includes," or "contains" one or more features and/or characteristics possesses those one or more features and/or characteristics, but is not limited to possessing only those one or more features and/or characteristics. Likewise, an element of a composition, coating, or process that "comprises," "has," "includes," or "contains" one or more features and/or characteristics possesses those one or more features and/or characteristics, but is not limited to possessing only those one or more features and/or characteristics, and may possess additional features and/or characteristics.

The grammatical articles "a," "an," and "the," as used in this specification, including the claims, are intended to include "at least one" or "one or more", unless otherwise indicated. Thus, the articles are used in this specification to refer to one or more than one (i.e., to "at least one") of the grammatical objects of the article. By way of example, "a component" means one or more components, and thus, possibly, more than one component is contemplated and can be employed or used in an implementation of the described compositions, coatings, and processes. Nevertheless, it is understood that use of the terms "at least one" or "one or more" in some instances, but not others, will not result in any interpretation where failure to use the terms limits objects of the grammatical articles "a," "an," and "the" to just one. Further, the use of a singular noun includes the plural, and the use of a plural noun includes the singular, unless the context of the usage requires otherwise.

Any patent, publication, or other document identified in this specification is incorporated by reference into this specification in its entirety unless otherwise indicated, but only to the extent that the incorporated material does not conflict with existing descriptions, definitions, statements, illustrations, or other disclosure material expressly set forth in this specification. As such, and to the extent necessary, the express disclosure as set forth in this specification supersedes any conflicting material incorporated by reference. Any material, or portion thereof, that is incorporated by reference into this specification, but which conflicts with existing definitions, statements, or other disclosure material set forth herein, is only incorporated to the extent that no conflict arises between that incorporated material and the existing disclosure material. Applicant reserves the right to amend this specification to expressly recite any subject matter, or portion thereof, incorporated by reference. The amendment of this specification to add such incorporated subject matter will comply with written description, sufficiency of description, and added matter requirements, including the requirements under 35 U.S.C. § 112(a) and Article 123(2) EPC.

What is claimed is:

1. A multi-layer curable composition comprising:
    a first curable composition layer applied over at least a portion of a substrate; and
    a second curable composition layer applied over at least a portion of the first curable composition layer;
    wherein the first curable composition layer and the second curable composition layer both independently comprise a polymeric resin; and
    wherein the first curable composition layer and/or the second curable composition layer, when cured, comprise a polymerization reaction of a dialkyl methylene malonate, a diaryl methylene malonate, a multifunctional form of a dialkyl methylene malonate, or a multifunctional form of a diaryl methylene malonate, or a combination of any thereof.

2. The multi-layer curable composition of claim 1, wherein the first curable composition layer and/or the second curable composition layer, when cured, comprise a polymerization reaction product of a multifunctional form of a dialkyl methylene malonate, or a multifunctional form of a diaryl methylene malonate, or a combination of any thereof.

3. The multi-layer curable composition of claim 1, wherein the first curable composition layer and/or the second curable composition layer, when cured, comprise a polymerization reaction product of diethyl methylene malonate and a multifunctional form of diethyl methylene malonate, wherein the multifunctional form of diethyl methylene malonate comprises a transesterification adduct of diethyl methylene malonate and at least one polyol.

4. The multi-layer curable composition of claim 1, wherein:
    (i) the first curable composition layer comprises an activator compound that activated polymerization reactions in the second curable composition layer when the second curable composition layer was applied over the first curable composition layer; or
    (ii) the second curable composition layer comprises an activator compound that activates polymerization reactions in the first curable composition layer upon application of the second curable composition layer over the first curable composition layer.

5. The multi-layer curable composition of claim 4, wherein the activator compound comprises a tertiary amine compound.

6. The multi-layer curable composition of claim 5, wherein the activator compound comprises 2-(dimethylamino)ethanol and/or 1,4-diazabicyclo[2.2.2]octane.

7. The multi-layer curable composition of claim 4, wherein the activator compound comprises an ionic liquid.

8. The multi-layer curable composition of claim 1, wherein the first curable composition layer comprises a curable composition that cures when heated at a temperature of less than 500° C.;
and wherein the second curable composition layer comprises the polymerization reaction product.

9. The multi-layer curable composition of claim 1, wherein the first curable composition layer comprises a thermoset resin comprising acrylic resin, polyester resin, polyurethane resin, polyurea resin, polyether resin, polythioether resin, polycarbonate resin, polycarbamate resin, epoxy resin, phenolic resin, or aminoplast resin, or a combination of any thereof, and wherein the second curable composition layer comprises a clearcoat layer comprising the polymerization reaction product.

10. The multi-layer curable composition of claim 1, wherein the first curable composition layer comprises the polymerization reaction product, and wherein the first curable composition layer is applied directly onto a metallic substrate.

11. The multi-layer curable composition of claim 1, wherein the first curable composition layer comprises the polymerization reaction product, and wherein the first curable composition layer is applied directly onto a non-metallic substrate.

12. The multi-layer curable composition of claim 11, wherein the non-metallic substrate is an automobile component.

13. The multi-layer curable composition of claim 1, wherein the substrate comprises an electrodeposited curable composition layer and the first curable composition layer is applied over the electrodeposited curable composition layer.

14. The multi-layer curable composition of claim 1, wherein the curable composition layer comprising the polymerization reaction product further comprises an extender.

15. The multi-layer curable composition of claim 14, wherein the extender comprises an anhydride-containing vinyl polymer.

16. An article comprising the multi-layer curable composition of claim 1 deposited over a surface of the article.

17. The article of claim 16, wherein the article comprises a vehicle component or a free-standing structure.

18. A process for applying a curable composition to a substrate comprising:
    applying a first curable composition layer over at least a portion of a substrate;
    applying a second curable composition layer over at least a portion of the first curable composition layer; and
    curing the first curable composition layer and/or the second curable composition layer;
    wherein the first curable composition layer and the second coating layer both independently comprise a polymeric resin; and
    wherein the first curable composition layer and/or the second curable composition layer, when cured, comprise a polymerization reaction product of a dialkyl methylene malonate, a diaryl methylene malonate, a multifunctional form of a dialkyl methylene malonate, or a multifunctional form of a diaryl methylene malonate, or a combination of any thereof.

19. The process of claim 18, wherein the curing of the first curable composition layer and/or the second curable composition layer comprises applying an activator solution over and/or under at least a portion of the first curable composition layer and/or the second curable composition layer.

20. The process of claim 19, wherein the activator solution comprises a tertiary amine compound.

21. The process of claim 18, wherein:
    (i) the first curable composition layer comprises an activator compound, and wherein the curing of the second curable composition layer comprises activating a polymerization reaction in the second curable composition layer with the activator compound in the first curable composition layer; or (ii) the second curable composition layer comprises an activator compound, and wherein the curing of the first curable composition layer comprises activating a polymerization reaction in the first curable composition layer with the activator compound in the second coating layer.

22. The process of claim 21, wherein the activator compound comprises a tertiary amine compound.

23. The process of claim 18, wherein at least one of the first curable composition layer and/or the second curable composition layer, when cured, comprises a polymerization reaction product of a multifunctional form of a dialkyl methylene malonate, or a multifunctional form of a diaryl methylene malonate, or a combination thereof.

24. The process of claim 18, wherein the first curable composition layer and/or the second curable composition layer comprises a polymerization reaction product of diethyl methylene malonate and a multifunctional form of diethyl methylene malonate, wherein the multifunctional form of diethyl methylene malonate comprises a transesterification adduct of diethyl methylene malonate and at least one polyol.

25. The process of claim 18, wherein the first curable composition layer comprises a curable composition that cures when heated at a temperature of less than 500° C., and wherein the second coating layer comprises the polymerization reaction product.

26. The process of claim 18, wherein the first curable composition layer, when cured, comprises a thermoset resin comprising acrylic resin, polyester resin, polyurethane resin, polyurea resin, polyether resin, polythioether resin, polycarbonate resin, polycarbamate resin, epoxy resin, phenolic resin, or aminoplast resin, or a combination of any thereof, and wherein the second coating layer, when cured, comprises a clearcoat layer comprising the polymerization reaction product.

27. The process of claim 18, wherein the first curable composition layer, when cured, comprises the polymerization reaction product, and wherein the first curable composition layer is applied directly onto a metallic substrate.

28. The process of claim 18, wherein the substrate comprises an electrodeposited curable composition layer and the first curable composition layer is applied over the electrodeposited curable composition layer.

29. The process of claim 18, wherein the curable composition layer comprising the polymerization reaction product further comprises an extender.

30. The process of claim 29, wherein the extender comprises an anhydride containing vinyl polymer.

* * * * *